(12) United States Patent
Yoo et al.

(10) Patent No.: US 11,596,127 B2
(45) Date of Patent: *Mar. 7, 2023

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 600 days.

This patent is subject to a terminal disclaimer.

(21) Appl. No.: 16/570,310

(22) Filed: Sep. 13, 2019

(65) Prior Publication Data

US 2020/0085003 A1    Mar. 19, 2020

Related U.S. Application Data

(60) Provisional application No. 62/733,393, filed on Sep. 19, 2018.

(30) Foreign Application Priority Data

Oct. 31, 2018  (KR) .................. 10-2018-0131636
May 24, 2019  (KR) .................. 10-2019-0060919

(51) Int. Cl.
    *A01K 7/02*    (2006.01)
(52) U.S. Cl.
    CPC .................. *A01K 7/025* (2013.01)

(58) Field of Classification Search
CPC . A01K 7/00; A01K 7/02; A01K 7/022; A01K 7/025; A01K 7/005
USPC ..................................... 119/72, 74
See application file for complete search history.

(56) References Cited

U.S. PATENT DOCUMENTS

| 1,512,629 | A | 10/1924 | Mueller et al. |
| 2,103,653 | A | 12/1937 | Weil |
| 2,510,446 | A | 6/1950 | Weil |
| 3,076,435 | A | 2/1963 | Seymour |

(Continued)

FOREIGN PATENT DOCUMENTS

| CA | 2082083 | 5/1994 |
| CA | 2587229 | 5/2006 |

(Continued)

OTHER PUBLICATIONS

Chinese Office Action dated May 21, 2021 issued in CN Application No. 201910888661.5.

(Continued)

*Primary Examiner* — David J Parsley
*Assistant Examiner* — Danielle A Clerkley
(74) *Attorney, Agent, or Firm* — Ked & Associates, LLP

(57) ABSTRACT

A pet water dispenser may include a water guide and filter surrounding a pump such that water is well-circulated throughout the pet water dispenser. The pet water dispenser may include a water tank, a water supply pipe to which water discharged from the pump is transferred, and a water supply plate having an upper surface over which water flows. The water guide may catch water falling from the upper surface to discharge the water back to the water tank.

17 Claims, 10 Drawing Sheets

(56) References Cited

U.S. PATENT DOCUMENTS

| | | |
|---|---|---|
| 3,303,824 A | 2/1967 | Anderson |
| 3,441,003 A | 4/1969 | Du Mond et al. |
| D221,755 S | 9/1971 | Johnson |
| 3,691,787 A | 9/1972 | Kaufmann |
| 3,765,614 A | 10/1973 | Bartl et al. |
| 4,100,885 A | 7/1978 | Kapplinger |
| 4,133,456 A | 1/1979 | Corini |
| 4,286,546 A | 9/1981 | Moore |
| 4,561,384 A | 12/1985 | Liff |
| 4,640,226 A | 2/1987 | Liff |
| 4,932,561 A | 6/1990 | Boxall |
| 5,031,689 A | 7/1991 | Jones et al. |
| 5,105,771 A | 4/1992 | Schafer |
| 5,140,134 A | 8/1992 | Reusche et al. |
| 5,174,245 A | 12/1992 | Bishop |
| 5,205,242 A | 4/1993 | Kasselman |
| 5,209,069 A | 5/1993 | Newnan |
| 5,345,063 A | 9/1994 | Reusche et al. |
| 5,601,199 A | 2/1997 | Marty |
| 5,699,669 A | 12/1997 | Gebhard |
| 5,791,287 A | 8/1998 | Gruber |
| 5,799,609 A | 9/1998 | Burns et al. |
| 5,845,605 A | 12/1998 | Malamphy |
| 5,884,582 A | 3/1999 | Duckworth |
| 6,230,653 B1 | 5/2001 | Tobin |
| 6,460,483 B1 | 10/2002 | Northrop et al. |
| 6,622,657 B2 | 9/2003 | Northrop et al. |
| 6,705,540 B2 | 3/2004 | Koshiyama et al. |
| 6,848,392 B1 | 2/2005 | Kreutzer, Jr. |
| 7,089,881 B2 | 8/2006 | Plante |
| 7,270,082 B2 | 9/2007 | Plante |
| 7,549,395 B2 | 6/2009 | Stenberg |
| 7,600,486 B2 | 10/2009 | Ellis |
| 7,743,698 B2 | 6/2010 | Muir et al. |
| 7,823,538 B1 | 11/2010 | Merager |
| 8,117,991 B1 | 2/2012 | Civitillo |
| 8,210,447 B2 | 7/2012 | Cohen |
| 8,387,566 B2 | 3/2013 | Graves et al. |
| 8,770,147 B2 | 7/2014 | Rowe |
| 8,770,148 B2 * | 7/2014 | Lipscomb ............. F04B 23/021 119/74 |
| 9,035,222 B2 | 5/2015 | Alexander |
| D738,579 S | 9/2015 | Owens et al. |
| D755,449 S | 5/2016 | Cornwell, Jr. et al. |
| 9,497,930 B2 | 11/2016 | Lipscomb et al. |
| 1,243,126 A1 | 10/2017 | Ziener |
| D819,898 S | 6/2018 | Poisson et al. |
| 10,165,753 B1 | 1/2019 | Huang |
| 11,154,034 B2 | 10/2021 | Youn et al. |
| 11,160,250 B2 | 11/2021 | Yoo et al. |
| 2002/0020673 A1 | 2/2002 | Nohren et al. |
| 2003/0115902 A1 | 6/2003 | Busick et al. |
| 2003/0140864 A1 | 7/2003 | Wenstrand |
| 2003/0213437 A1 | 11/2003 | Norris |
| 2005/0166853 A1 | 8/2005 | Plante |
| 2006/0174838 A1 | 8/2006 | Plante |
| 2006/0231040 A1 | 10/2006 | Bast et al. |
| 2006/0288947 A1 | 12/2006 | Perlsweig et al. |
| 2007/0045159 A1 | 3/2007 | Lee |
| 2007/0095297 A1 | 5/2007 | Boyd |
| 2007/0199512 A1 | 8/2007 | Ellis |
| 2007/0227456 A1 | 10/2007 | Borey |
| 2008/0078330 A1 | 4/2008 | McCallum et al. |
| 2008/0169249 A1 | 7/2008 | Ter Stege |
| 2008/0190374 A1 | 8/2008 | Farris |
| 2008/0257272 A1 | 10/2008 | Bolda |
| 2009/0126641 A1 | 5/2009 | Anderson et al. |
| 2009/0218985 A1 | 9/2009 | Hallett |
| 2010/0095897 A1 | 4/2010 | Rowe |
| 2010/0276508 A1 | 11/2010 | Davies |
| 2010/0300366 A1 | 12/2010 | Lipscomb et al. |
| 2011/0067638 A1 | 3/2011 | Lipscomb et al. |
| 2011/0102945 A1 | 5/2011 | Isono et al. |
| 2011/0214613 A1 | 9/2011 | Diamond |
| 2011/0226470 A1 | 9/2011 | Latrille et al. |
| 2011/0259273 A1 | 10/2011 | Lipscomb et al. |
| 2012/0017839 A1 | 1/2012 | Veness et al. |
| 2012/0111280 A1 | 5/2012 | Shin et al. |
| 2012/0216751 A1 | 8/2012 | Rowe |
| 2013/0087102 A1 | 4/2013 | Lipscomb et al. |
| 2013/0092090 A1 | 4/2013 | McCallum |
| 2013/0175802 A1 | 7/2013 | Breau et al. |
| 2013/0192529 A1 | 8/2013 | Kruger et al. |
| 2013/0200064 A1 | 8/2013 | Alexander |
| 2013/0228132 A1 | 9/2013 | Lipscomb et al. |
| 2013/0255280 A1 | 10/2013 | Murphy et al. |
| 2014/0033984 A1 | 2/2014 | Li et al. |
| 2014/0053781 A1 | 2/2014 | Lewis |
| 2014/0076242 A1 | 3/2014 | Ho |
| 2014/0165607 A1 | 6/2014 | Alexander |
| 2014/0251223 A1 | 9/2014 | Rowe et al. |
| 2014/0353335 A1 | 12/2014 | Van Diepen |
| 2015/0135728 A1 | 5/2015 | Swanson et al. |
| 2015/0189862 A1 | 7/2015 | Lipscomb |
| 2015/0196157 A1 | 7/2015 | Swisth |
| 2015/0276204 A1 | 10/2015 | Ray |
| 2015/0313180 A1 | 11/2015 | Lipscomb et al. |
| 2015/0353335 A1 | 12/2015 | Breault |
| 2016/0000037 A1 | 1/2016 | Lipscomb et al. |
| 2016/0099599 A1 | 4/2016 | Ho et al. |
| 2016/0113249 A1 | 4/2016 | Kuo |
| 2016/0118179 A1 | 4/2016 | Park et al. |
| 2016/0159633 A1 | 6/2016 | Diffenderfer |
| 2016/0286757 A1 | 10/2016 | Armstrong |
| 2016/0287363 A1 | 10/2016 | Miller |
| 2017/0245465 A1 | 8/2017 | Oates et al. |
| 2017/0255186 A1 | 9/2017 | Ryznar et al. |
| 2018/0054073 A1 | 2/2018 | Olson et al. |
| 2018/0160648 A1 | 6/2018 | Goh |
| 2018/0177325 A1 | 6/2018 | Lyons et al. |
| 2019/0075755 A1 | 3/2019 | Imaizumi et al. |
| 2019/0140471 A1 | 5/2019 | Johanski et al. |
| 2019/0162460 A1 | 5/2019 | Oh |
| 2019/0227580 A1 | 7/2019 | von der Assen et al. |
| 2019/0239476 A1 | 8/2019 | Mai et al. |
| 2019/0239491 A1 | 8/2019 | Yu et al. |
| 2019/0357747 A1 | 11/2019 | Keiler, III |
| 2020/0303971 A1 | 9/2020 | Hall et al. |
| 2020/0337266 A1 | 10/2020 | Yu et al. |
| 2020/0355751 A1 | 11/2020 | Swaans et al. |

FOREIGN PATENT DOCUMENTS

| | | |
|---|---|---|
| CH | 711714 | 1/2022 |
| CN | 2322412 | 6/1999 |
| CN | 2351955 | 12/1999 |
| CN | 1701206 | 11/2005 |
| CN | 2776044 | 5/2006 |
| CN | 1870903 | 11/2006 |
| CN | 200994393 | 12/2007 |
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102934044 | 2/2013 |
| CN | 202722224 | 2/2013 |
| CN | 202873523 | 4/2013 |
| CN | 203136752 | 8/2013 |
| CN | 203544552 | 4/2014 |
| CN | 203618522 | 6/2014 |
| CN | 103917147 | 7/2014 |
| CN | 103931515 | 7/2014 |
| CN | 203913286 | 11/2014 |
| CN | 204707695 | 10/2015 |
| CN | 204722018 | 10/2015 |
| CN | 105265331 | 1/2016 |

(56) References Cited

FOREIGN PATENT DOCUMENTS

| | | |
|---|---|---|
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 | 5/2017 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 109997713 | 7/2019 |
| DE | 20 2016 107 252 | 3/2018 |
| EP | 0 894 430 | 2/1999 |
| EP | 1 188 995 | 3/2002 |
| EP | 1 566 099 | 8/2005 |
| EP | 3 315 022 | 5/2018 |
| EP | 3315022 A1 * | 5/2018 ............... A01K 7/02 |
| EP | 3 520 607 | 8/2019 |
| FR | 2 726 452 | 5/1996 |
| GB | 2 458 173 | 9/2009 |
| GB | 2574921 | 12/2019 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-0835557 | 6/2008 |
| KR | 10-2010-0046615 | 5/2010 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |
| KR | 10-1825334 | 2/2018 |
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

United States Office Action dated Oct. 5, 2021 issued in co-pending related U.S. Appl. No. 16/571,074.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
United States Office Action dated Feb. 1, 2022 issued in co-pending related U.S. Appl. No. 16/574,237.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.
Chinese Office Action dated Apr. 1, 2021 issued in CN Application No. 201910886305.X.
Chinese Office Action dated Apr. 9, 2021 issued in CN Application No. 201910886526.7.
United States Office Action dated Mar. 30, 2021 issued in co-pending related U.S. Appl. No. 16/571,090.
European Search Report dated Feb. 27, 2020 issued in Application No. 19198292.5.
European Search Report dated Feb. 27, 2020 issued in Application No. 19198298.2.
European Search Report dated Apr. 9, 2020 issued in EP Application No. 19198174.5.
United States Office Action dated Jun. 2, 2020 issued in co-pending related U.S. Appl. No. 16/574,259.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
Chinese Office Action dated May 17, 2021 issued in CN Application No. 201910889361.9.
Chinese Office Action issued in Application No. 201910888224.3 dated Apr. 12, 2021.

(56) References Cited

OTHER PUBLICATIONS

Chinese Office Action issued in Application No. 201910888611.7 dated Apr. 12, 2021.
Chinese Office Action issued in Application No. 201910888695.4 dated Apr. 16, 2021.
European Search Report dated Feb. 24, 2020 issued in EP Application No. 19198289.1.
Chinese Office Action dated Mar. 31, 2021 issued in CN Application No. 201910886533.7.
United States Office Action dated Dec. 6, 2021 issued in co-pending related U.S. Appl. No. 16/569,827.
United States Office Action dated Dec. 10, 2021 issued in co-pending related U.S. Appl. No. 16/571,075.
Chinese Office Action dated Nov. 10, 2021 issued in CN Application No. 201910886533.7.
Chinese Office Action dated Nov. 10, 2021 issued in CN Application No. 201910886714.X.
United States Office Action dated Feb. 11, 2022 issued in co-pending related U.S. Appl. No. 16/574,322.
European Search Report dated Feb. 3, 2020 issued in EP Application No. 19198170.3.
Chinese Office Action dated Mar. 30, 2021 issued in CN Application No. 201910886714.X.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
Chinese Office Action dated May 10, 2021 issued in CN Application No. 201910888718.1.
European Search Report dated Apr. 23, 2020 issued in EP Application No. 19198303.0.
United States Office Action dated May 11, 2021 issued in co-pending related U.S. Appl. No. 16/571,093.
U.S. Appl. No. 16/574,259, filed Sep. 18, 2019.
U.S. Appl. No. 16/574,418, filed Sep. 18, 2019.
U.S. Appl. No. 16/571,090, filed Sep. 14, 2019.
U.S. Appl. No. 16/569,841, filed Sep. 13, 2019.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
United States Office Action dated May 19, 2022 issued in co-pending related U.S. Appl. No. 16/569,827.
United States Office Action dated Jun. 1, 2022 issued in co-pending related U.S. Appl. No. 16/571,075.
United States Office Action dated Jun. 2, 2022 issued in co-pending related U.S. Appl. No. 16/570,279.
United States Office Action dated Jun. 15, 2022 issued in co-pending related U.S. Appl. No. 16/569,908.
Dong, CN108464253A Machine Translation Description, Aug. 31, 2018, obtained Jan. 13, 2022 (Year: 2018).
United States Office Action dated Mar. 17, 2022 issued in co-pending related U.S. Appl. No. 16/574,581.
United States Office Action dated Mar. 24, 2022 issued in co-pending related U.S. Appl. No. 16/571,089.
Chinese Notice of Allowance dated Apr. 8, 2022 issued in CN Application No. 201910888611.7.
Chinese Notice of Allowance dated Jul. 11, 2022 issued in CN Application No. 201910886305.X.
United States Office Action dated Jul. 29, 2022 issued in co-pending related U.S. Appl. No. 16/574,322.
United States Office Action dated Sep. 19, 2022 issued in co-pending related U.S. Appl. No. 16/569,827.
U.S. Appl. No. 16/574,219, filed Sep. 18, 2019.
U.S. Appl. No. 16/574,240, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
U.S. Appl. No. 16/569,908, filed Sep. 13, 2019.
United States Office Action dated Jun. 23, 2022 issued in co-pending related U.S. Appl. No. 16/574,368.
United States Office Action dated Jul. 5, 2022 issued in co-pending related U.S. Appl. No. 16/574,240.
United States Office Action dated Jul. 7, 2022 issued in co-pending related U.S. Appl. No. 16/574,474.
United States Office Action dated Aug. 29, 2022 issued in co-pending related U.S. Appl. No. 16/571,245.
Chinese Notice of Allowance dated Aug. 31, 2022 issued in CN Application No. 201910889318.2.
Chinese Office Action dated Sep. 21, 2022 issued in CN Application No. 201910888224.3.
United States Office Action dated Oct. 11, 2022 issued in co-pending related U.S. Appl. No. 16/570,279.
United States Office Action dated Oct. 13, 2022 issued in co-pending related U.S. Appl. No. 16/571,089.

\* cited by examiner

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018, and Korean Application No. 10-2019-0060919 filed on May 24, 2019, and 10-2018-0131636 filed on Oct. 31, 2018, whose entire disclosure(s) is/are hereby incorporated by reference.

BACKGROUND

1. Field

A liquid water dispenser to supply liquid to an animal, e.g., a pet, is disclosed herein.

2. Background

In recent years, the population of people raising a pet has increased, in addition attachment and interest pets. Like most animals, pets must drink water to survive and maintain a biorhythm. Since pets are often left alone and since communication with their owners is difficult, the demand for pet water dispensers or water supply devices has increased.

European Patent No. 3315022 A1 and U.S. Publication No. 2014/053781 disclose drinking bowls for pets. However, such drinking bowls have various disadvantages, which the present disclosure solves.

The above references are incorporated by reference herein where appropriate for appropriate teachings of additional or alternative details, features and/or technical background.

DETAILED DESCRIPTION OF THE INVENTION

Figure 1:
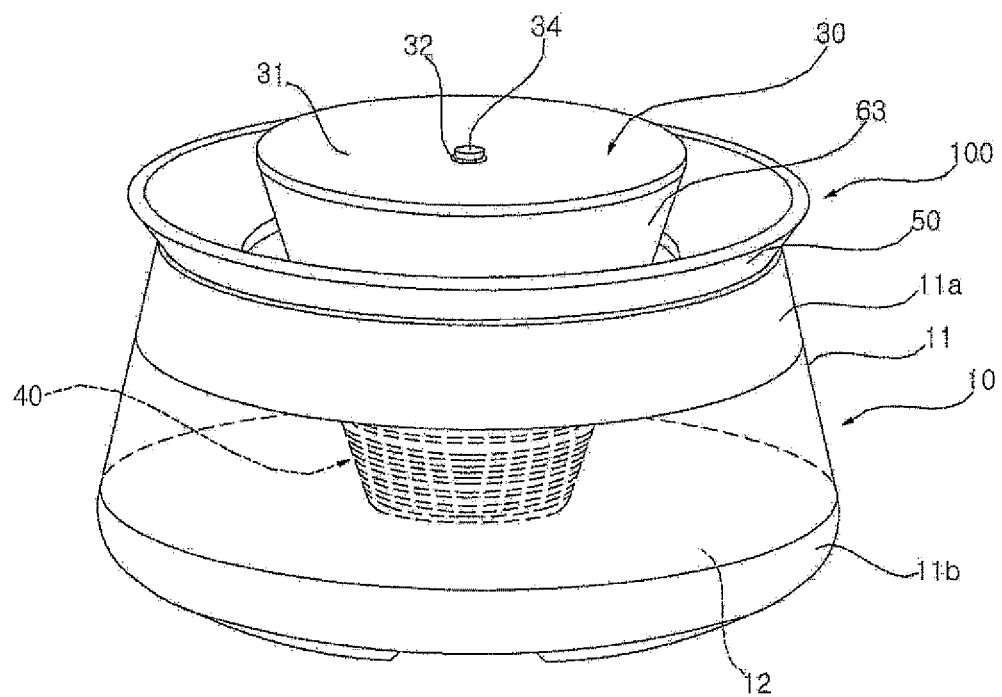
FIG. 1 is a perspective view showing a pet water dispenser according to an embodiment.
Figure 2:
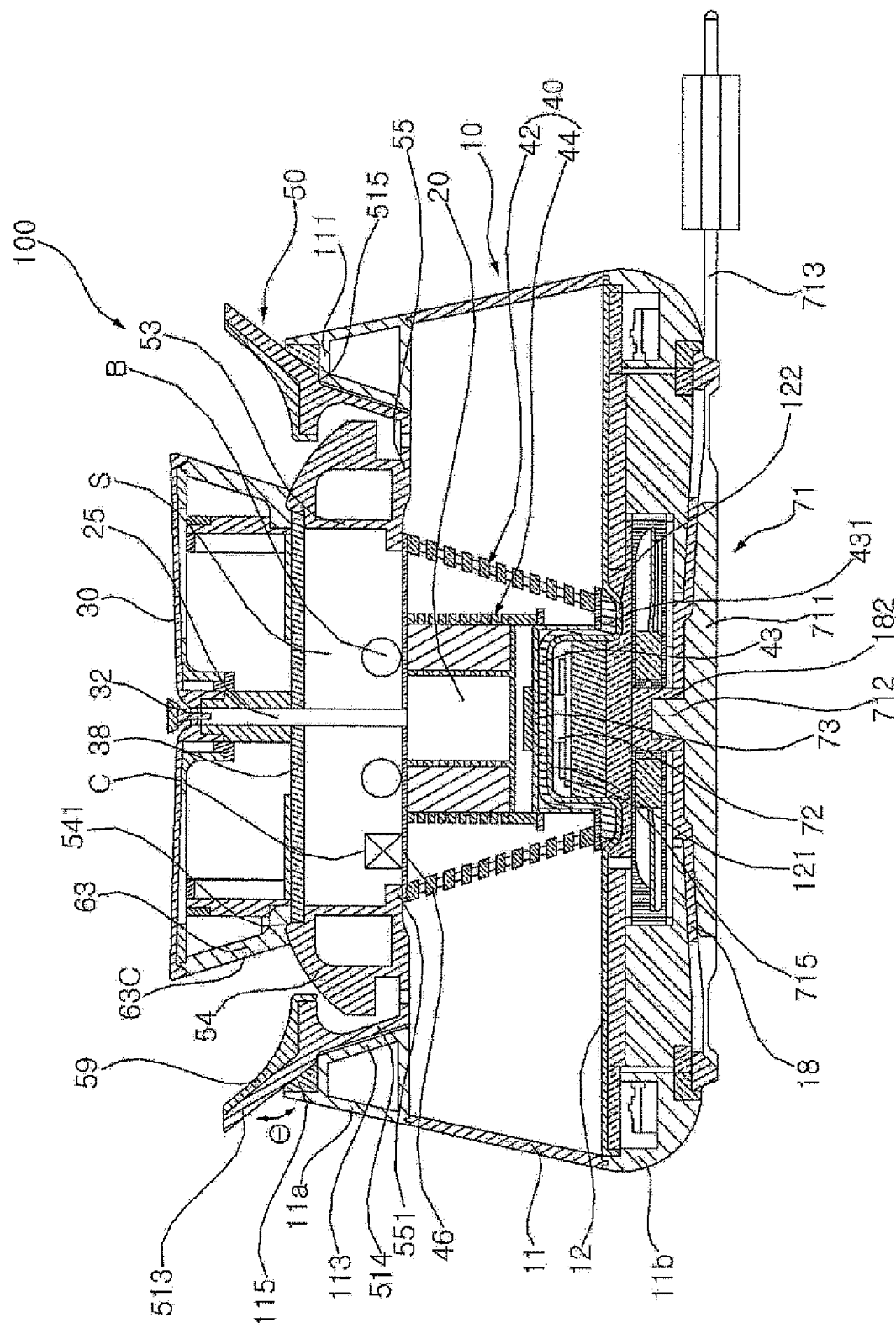
FIG. 2 is a side sectional view of the pet water dispenser shown in FIG. 1.
Figure 3:
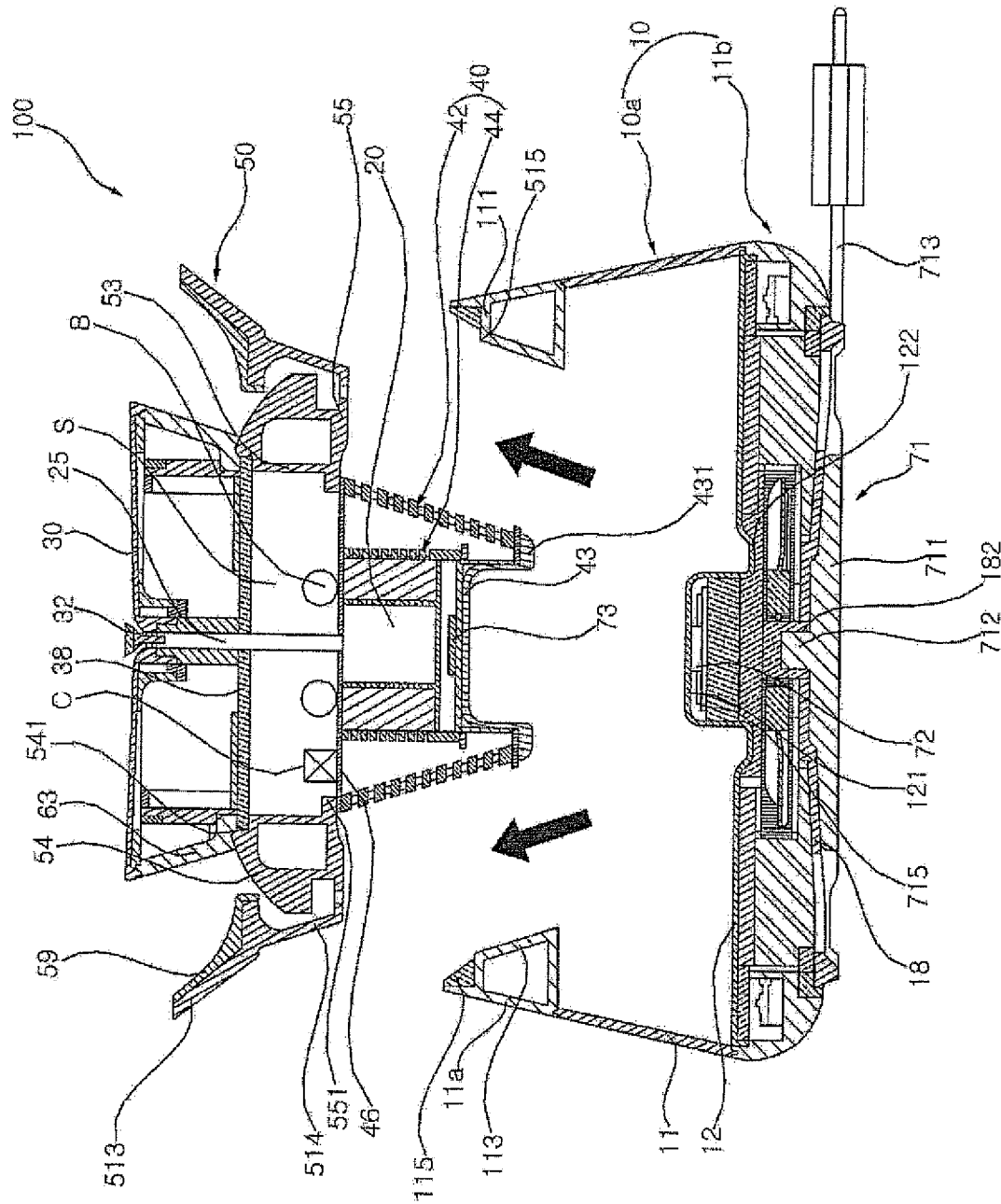
FIG. 3 is a view showing a state in which an inner assembly shown in FIG. 2 is separated from a water tank.

Referring to FIGS. 1 to 3, a pet water dispenser according to an embodiment may include a water tank or storage chamber 10 having an opened top or upper opening and an inner assembly 100 covering the opened top of the water tank 10. The inner assembly 100 may be detachably coupled to the water tank 10.

The inner assembly 100 may have an upper surface 31 of a water supply plate or top plate 30 and a support 63 to project the upper surface 31 upward. The support 63 may serve as a light diffuser and may also be referred to as a light guide.

An upper end of an outer circumferential surface of the support 63 may be positioned at an edge of the upper surface 31. The outer circumferential surface of the support 63 may be formed as an inclined surface 63C having a radius that recedes from the upper end to a lower end. Thus, the support 63 may have a truncated cone shape.

When the inner assembly 100 is inserted into and coupled to the water tank 10, an upper portion of an inner assembly 100 may protrude above the water tank 10 while a lower portion of the inner assembly 100 may be inserted into the water tank 10. A pump 20 to pump water in the water tank 10 and to supply pumped water to the upper surface 31 may be provided below the inner assembly 100.

The water pumped to the upper surface 31 may fall off the edge of the upper surface 31. If a pumping capacity of the pump 20 is high, the water may fall directly off the edge of the upper surface 31 into a water guide or water receiver 50 provided below the upper surface 31 to catch falling water. The water guide 50 may also be referred to as a drip tray or splash guard. If the pumping capacity of the pump 20 is low, water may pool on the upper surface 31 and/or spill downward from the edge of the upper surface 31 on the inclined surface 63C to the water guide 50. Water in the water guide 50 may be discharged back into the water tank 10. The pet may drink water flowing or pooling on the upper surface 31, may also drink water falling off the edge of the upper surface 31, and/or pooled water between the support 63 and a coating layer 59 of the water guide 50.

A user may lift the inner assembly 100 from the water tank 10 by holding the water guide 50. The user may easily exchange or replace the water stored in the water tank 10 or easily wash the water tank 10 after detaching the inner assembly 100 from the water tank 10.

The inner assembly 100 may include the pump 20, a water supply pipe 25, the water supply plate 30, and the water guide 50. The pump 20, the water supply pipe 25, the water supply plate 30, and the water guide 50 may be integrally combined to form a single inner assembly 100.

The pump 20 may be provided in a center of the water tank 10 when the inner assembly 100 is coupled to the water tank 10. The water supply pipe 25 may transfer water discharged from the pump 20 to the water supply plate 30, and may extend in a vertical direction of the inner assembly 100.

The water supply plate 30 may be provided above a central portion of the water tank 10. The water supply plate 30 may have the upper surface 31 over which water supplied from the water supply pipe 25 flows. The upper surface 31 may form an upper surface of the inner assembly 100.

A water supply hole 32 to discharge water supplied from the water supply pipe 25 to the upper surface 31 may be formed at a center of the water supply plate 30. The water supply hole 32 may communicate with an upper end or outlet 27 of the water supply pipe 25.

The water moved to the upper surface 31 through the water supply hole 32 may flow down to the water guide 50 on the inclined surface 63 after falling off or spilling over the edge of the upper surface 31, or may immediately fall to the water guide 50 after falling off the upper surface 31. An edge 311 of the water supply plate 30 (FIG. 7) may be formed as a convex curved surface or sloped surface to encourage downward flow of water on the upper surface 31.

Figure 10:
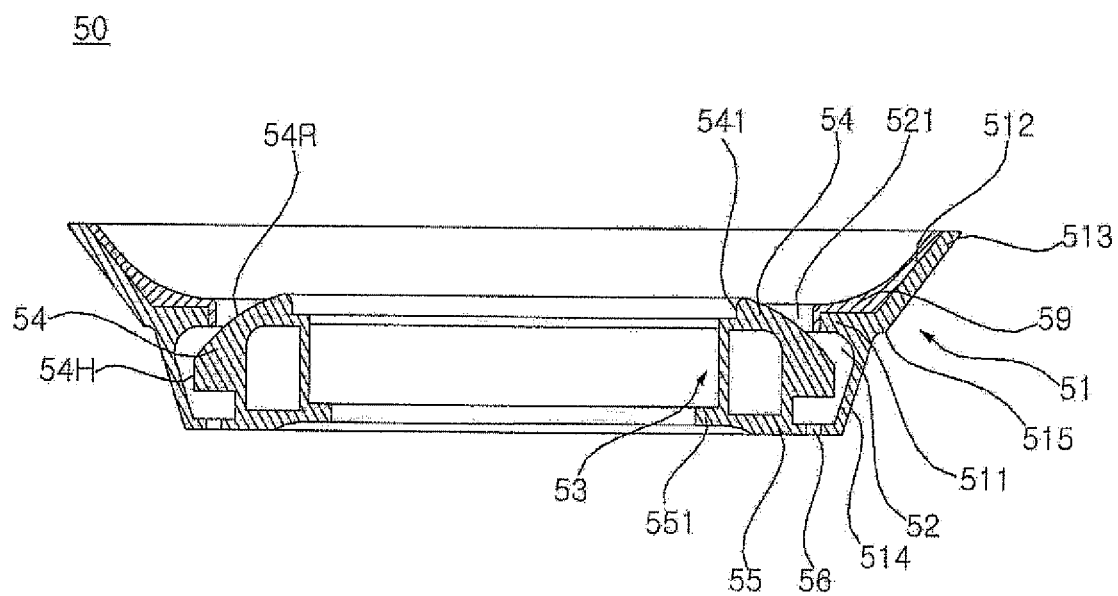
FIG. 10 is a side cross-sectional view showing a water guide.

Alternatively or in addition thereto, the water guide 50 may at least partially cover an opened top of the water tank 10 and be provided below the water supply plate 30 to receive water from the water supply plate 30 or the support 63 and supply or guide the water back into the water tank 10. Thus, water may be pumped via the pump 20, transferred to the water supply plate 30 via the water supply pipe 35, discharged to the upper surface 31 via the water supply hole 32, either spill down the inclined surface 63 to the water guide 50 or fall directly to the water guide 50, and drain from the water guide 50 back into the water tank 10 via a drain passage 52 and discharge hole 56 (FIG. 10).

The inner assembly 100 may optionally include a filter or filter assembly 40 to filter the water stored in the water tank 10, The pump 20, the water supply pipe 25, the water supply plate 30, the water guide 50, and the filter 40 may be formed as a single inner assembly 100. If the inner assembly 100 comprises the filter assembly 40, the pump 20 may pump the water filtered via the filter assembly 40.

Figure 5:
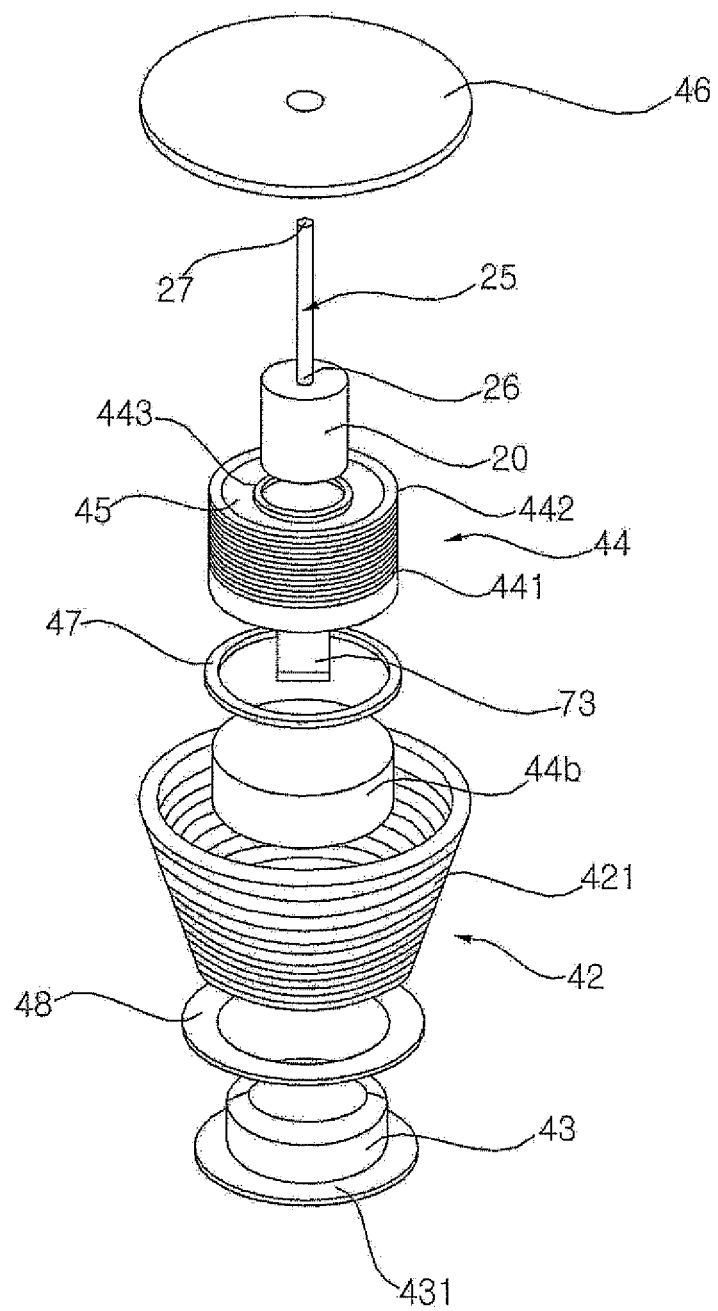
FIG. 5 is an exploded perspective view showing a filter and a pump shown in FIG. 2, Fig.
Figure 7:
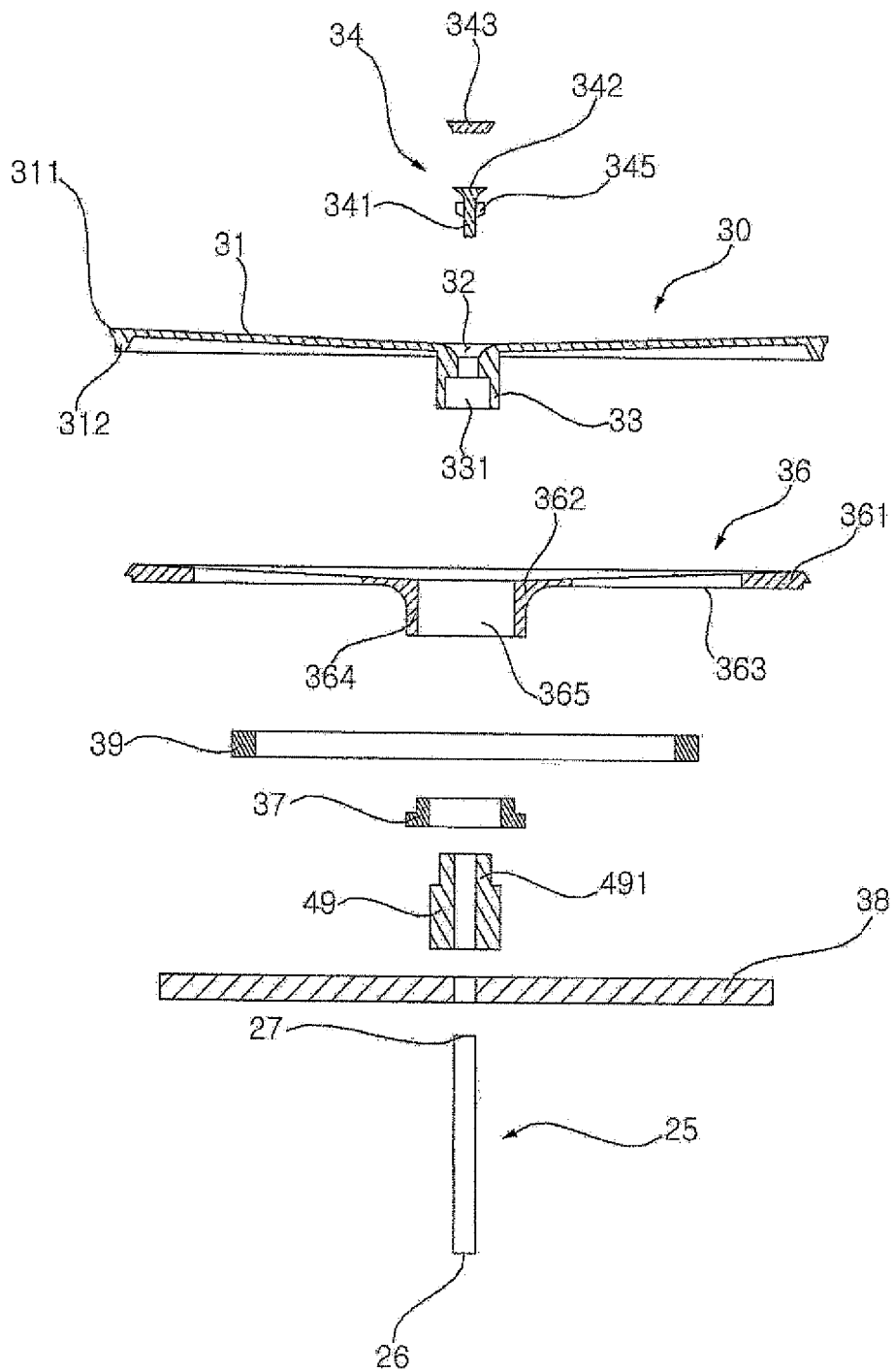
FIG. 7 is a an exploded side sectional view of an upper portion of the inner assembly in FIG. 2.

The filter assembly 40 may include a first or outer filter 42 and a second or inner filter 44 provided within the first filter 42. In addition, the inner assembly 100 may further include at least one UV (Ultraviolet Ray) filter or light 47, 48, and/or 49 to sterilize water via ultraviolet radiation (FIGS. 5 and 7). The UV filter 47, 48, and/or 49 may comprise a UV LED (Ultraviolet Light-Emitting Diode) and emit UV light or radiation.

Figure 6:
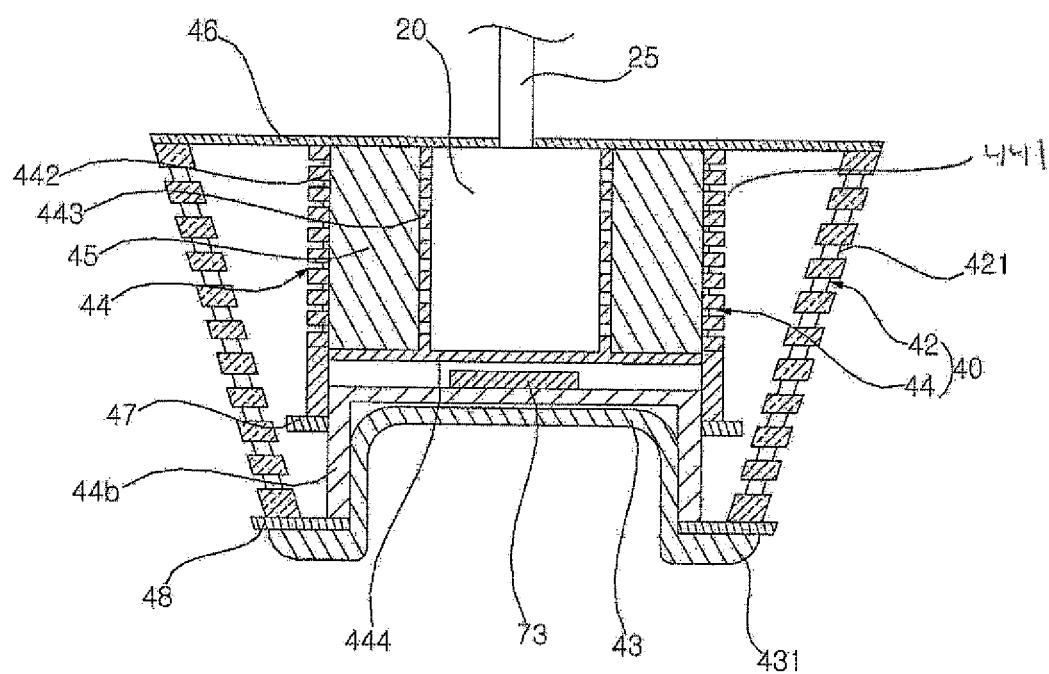
FIG. 6 is a side sectional view of the filter and the pump shown in FIG. 2.

When the inner assembly 100 further comprises at least one UV filter 47, 48, or 49, the inner assembly 100 may include at least one UV filter 47 or 48 provided on at least one of a bottom surface of the first and second filter 42 or 44 (FIG. 6). The UV filters 47 or 48 may be or include an engagement disc to couple the first and/or second filter to a support cylinder 44b and/or a lower filter cover 43 to be described later with reference to FIG. 6. The inner assembly 100 may further include the UV filter 49 to sterilize water in the water supply pipe 25. Any UV filters (47, 48, 49) included may be joined with the rest of the inner assembly 100 to form a single inner assembly 100.

Referring to FIG. 3, the water tank 10 may include a container 10a to store water, and a container support 11b provided below the container 10a to form a space shielded from water which will be described later. The container support 11b may also separate the container 10a from a ground or floor surface on which the pet water dispenser is installed.

The container 10a may include a main wall 11 extending from a bottom plate 12 and an upper wall 11a provided above the main wall 11. Water may be stored in an inner space formed by the main and upper walls 11 and 11a and the bottom plate 12, and the main and upper walls 11 and 11a may define sides of the container 10a. The main and upper walls 11 and 11a may be formed in a cylindrical shape having a diameter that recedes toward upper ends and may have truncated cone shapes. A diameter of the upper end of the main wall 11 may be the same or similar to a diameter of a lower end of the upper wall 11a to create a seamless appearance.

The main wall 11 may be formed of a transparent material (e.g., glass or plastic), and the upper wall 11a may be formed of an opaque material (e.g., stainless steel or pigmented plastic). The bottom plate 12 may also be made of an opaque material (e.g., stainless steel or pigmented plastic) to visually hide electronic devices provided in the container support 11b. The main wall 11 may form a portion of the container 10a where water is substantially stored. The user may visually check an amount of water and possible contamination level by looking through the transparent material of the main wall 11.

An upper end of the container support 11b may be positioned below the main wall 11. An outer peripheral surface or outer surface 116 (FIG. 4) of the container support 11b may have an outward convex curvature such that a lower end of the container support 11b may be positioned closer to a center of the water tank than the upper end of the container support 11b.

The container support 11b may be formed of an opaque material. The main wall 11, the upper wall 11a, and the container support 11b may be formed of different materials. The main wall 11, the upper wall 11a, and the container support 11b may form sides of the water tank 10. The main wall 11 may be provided on an upper side of the bottom plate 12. The container support 11b may be provided on a lower side of the bottom plate 12.

A lower portion of the water guide 50 may be inserted into the water tank 10 to effectively guide water back to the water tank 10, and an upper portion of the water guide 50 may protrude outward from the water tank 10 to effectively catch water. An outer surface of the water guide 50 may be formed with an upper inclined surface or upper guide surface 513 and a lower inclined surface or lower guide surface 514. The upper inclined surface 513 may be seated on an upper corner or edge of an inner inclined surface or inner tank wall 113 of the water tank 10.

The lower inclined surface 514 may be configured to have an inclination that is the same or similar to an inclination of the inner tank wall 113, and may be provided adjacent to the inner tank wall 113 when the inner assembly 100 is coupled to the water tank 10. The inner tank wall 113 of the water tank 10 may support the upper and lower inclined surfaces 513 and 514 of the water guide 50. The inner tank wall 113 will be described in more detail later.

The pump 20 and the filter assembly 40 may be provided below the water guide 50 and inserted into the water tank 10 when the inner assembly 100 is coupled to the water tank 10. The filter assembly 40 may be coupled to an inner guide wall or inner support wall 53 of the water guide 50 (FIG. 10).

The inner assembly 100 may further include a partition plate 38 be spaced apart from and provided below the water supply plate 30. The water supply pipe 25 may penetrate the partition plate 38. The partition plate 38 may be inserted into a groove 541 formed on an upper surface of the water guide 50 to close an opened top surface of the water guide 50. As an example, the groove 541 may be formed on an upper surface or end of the inner guide wall 53 of the water guide 50. The partition plate 38 may separate a sealed space housing an auxiliary battery B and controller C from a sealed space housing a printed circuit board (PCB) 623 of an illumination assembly 60 described later.

A lower end 63b (FIG. 8) of the support 63 may be coupled to the upper surface of the water guide 50 to couple the water guide 50 to the water supply plate 30. The support 63 may also be coupled to the partition plate 38 to secure a coupling of the partition plate 38 to the water guide 50.

The support 63 may be formed in a cylindrical shape or truncated cone shape. An illumination or light device 61 may be provided inside the support 63. The support 63 may be formed of a light diffusing material to emit light emitted by the light device 61. See FIG. 8.

Top and bottom ends of the support 63 may be respectively opened such that the support 63 may form a hollow truncated cone. The water supply plate 30 may cover the opened top end of the support 63 and the partition plate 38 may cover the opened bottom end of the support 63. The water supply plate 30 and the support 63 may be provided above the inner guide wall 53 of the water guide 50. Details of the light device 61 and a light emission through the support 63 will be described later with reference to FIG. 8.

When the inner assembly 100 is coupled to the water tank 10, the pump 20 may be provided above and spaced apart from the bottom plate 12. The water supplied to the water supply pipe 25 may flow to the upper surface 31 and may flow over the edge 311 of the water supply plate 30. When the inner assembly 100 is coupled to the water tank 10, the filter assembly 40 may be provided in the center of the water tank 10. The filter assembly 40 may filter foreign substances contained in the water stored in the water tank 10 before the water flows into the pump 20.

The pet water dispenser may also include a power supply device or assembly described later, an illumination assembly 60, a water level sensor 86, a water temperature sensor 85, a proximity sensor, a pollution or contamination level sensor, and a water temperature maintenance device or assembly.

Figure 4:
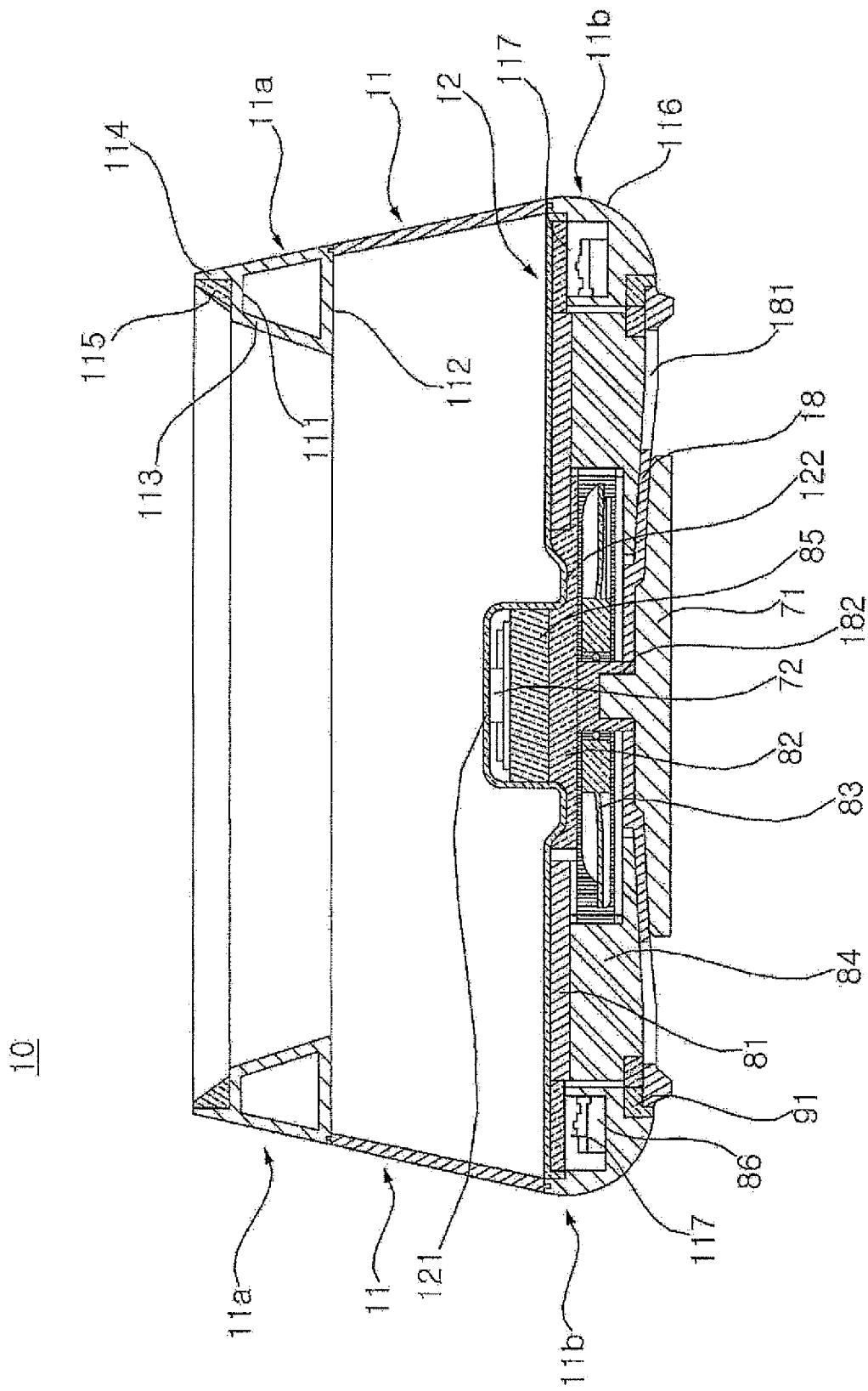
FIG. 4 is a side sectional view showing the water tank shown in FIG. 2.

Referring to FIG. 4, although the water tank 10 may have a cylindrical or truncated conical shape, the shape of the water tank 10 is not limited thereto and may be formed in other shapes. In the case where the water tank 10 is formed as a truncated cone shape (at container 10a) on top of convex curved shape (at the container support 11b), even if a considerable external impact is applied to the water tank 10, the water tank 10 may be stably positioned and not overturned, preventing spillage.

The upper wall 11a may extend upward from the main wall 11. First and second protruding plates 111 and 112 may extend from an inner surface of the upper wall 11a to protrude toward the center of the water tank 10. The inner tank wall 113 may extend between the first and second protruding plates 111 and 112. The inner tank wall 113 may be inclined inward toward a center of the tank from a top end to a bottom end, and the lengths of the first and second protruding plates 111 and 112 may be configured to give the inner tank wall 113a predetermined inclination.

The first and protruding plates 111 and 112 may extend in a horizontal direction and may be spaced apart from each other in a vertical direction. The first protruding plate 111 may be provided above the second protruding plate 112. Since there may be a space between the first and second protruding plates 111 and 112 and between the inner tank wall 113 and the upper wall 11a, a weight and manufacturing cost of the water tank 10 may be reduced, especially when the upper wall 11a is formed of an expensive material to enhance aestheticism. The second protruding plate 112 may be formed so as to protrude further inward than the first protruding plate 111, and the inner guide wall 113 may couple to ends of the first and second protruding plates 111 and 112.

The upper wall 11a may extend upward in a same direction as the main wall 11, and an inclination of the upper wall 11a may be similar to an inclination of the main wall 11. Alternatively, the upper wall 11a may extend upward from the main wall 11 so as to be wider or narrower in the radial direction than the main wall 11.

The upper wall 11a may be formed with a projection or extension 114 protruding upward from the first protruding plate 111. A bumper 115 having packing or cushioning may be attached to an inner surface of the extension 114 and/or an upper surface of the first protruding plate 111. The bumper 115 may be made of an elastic material (e.g., rubber), and may also be referred to as packing. An outer wall 51 of the water guide 50, which may include the upper and lower inclined surfaces 513 and 514, may be placed on the first protruding plate 111 to be in close contact with the bumper 115. As shown in FIG. 2, the upper inclined surface 513 may be placed on the first protruding plate 111 and contact the bumper 115. Details of the water guide 50 will be provided with reference to FIG. 10.

A protrusion 121 that curves convexly upward to have a hollow inner side may be formed at the center of the bottom plate 12. A first wireless power transfer device 72 (e.g., a wireless power transmitter and/or transceiver) may be installed in an inner space of the protrusion 121. The bottom plate 12 may be formed with a ring-shaped groove or recess 122 recessed downward around the protrusion 121.

The bottom plate 12 may be formed integrally with the main wall 11. Alternatively, the bottom plate 12 may be formed separately from the main wall 11 and later coupled with the main wall 11 and/or the container support 11b.

The main wall 11, the upper wall 11a, and the container support 11b may be made of the same material and integrally manufactured. Alternatively, the main wall 11, the upper wall 11a, and the container support 11b may be separately made of different materials and welded or bonded for integration. As an example, the main wall 11 may be formed of a different material from the upper wall 11a and the container support 11b, and the upper wall 11a and the container support 11b may be formed of the same material.

The upper wall 11a and the container support 11b may be made of a beautiful or sleek material for an enhanced aesthetic appeal (e.g., stainless steel or pigmented plastic). The main wall 11 may be made of a transparent material (e.g., glass or plastic) to allow easy viewing of a water level. The main wall 11, the upper wall 11a, and the container support 11b may be welded or bonded together.

The outer peripheral surface 116 of the container support 11b may extend and curve from a lower edge of the main wall 11 downward. The outer peripheral surface 16 may be curved so that when an external impact is applied to the water tank 10 and the water tank 10 is tilted, the outer peripheral surface 116 may roll back to an initial orientation, thereby preventing the water tank 10 from being overturned and spilling.

The lower end of the outer peripheral surface 116 may be provided closer to a center of the water tank 10 than an upper end of the outer circumferential surface 116. When the pet water dispenser is placed on the ground or floor, a user may easily lift the water tank 10 by holding the outer peripheral surface 116 near the curve, and prevent wedging of the user's fingers between the container support 10b and the floor. There may be optional stilts or legs provided under the container support 11b to space the container support 11b apart from the ground, i.e., ground clearance.

An inner circumferential surface of the container support 11b may include a mounting portion 117. The container support 11b may be formed as a ring or hollow cylinder, and the mounting portion 117 may protrude from an inner surface of the container support 11b. An upper surface of the mounting portion 117 may have a predetermined area overlapping an edge of the bottom plate 12. A water level sensor 86 may be installed in a recess of the upper surface of the mounting portion 117.

The water level sensor 86 may be a strain gauge or load sensor that senses a weight of the water stored in the water tank 10 applied to the bottom plate 12. A control unit or controller C may determine the water level in the water tank 10 based on the weight of the water in the water tank 10 sensed by the water level sensor 86.

Further, the container support 11b may be formed to be hollow so that a top and bottom are open. The bottom plate 12 may close the opened top of the container support 11b and a base plate 18 may close the opened bottom of the container support 11b. The base plate 18 may be spaced apart from the bottom plate 12.

Various electronic devices or components described later may be installed in a space formed between the base plate 18 and the bottom plate 12. The base plate 18 may be placed on the docking station 71, and may be have a circular shape.

Ventilation holes or openings 181 may be formed in the base plate 18, The ventilation holes 181 may also be referred to as vents. A plurality of ventilation holes 181 may be formed as slots or slits extending vertically or horizontally, and may be radially arranged along a circumferential direction of the base plate 18.

An inner space of the container support 11b may be defined as a space located on an inner side of the mounting portion 117. A thermoelectric element 81 may cover an opened upper side of the inner space of the container support 11b. The base plate 18 may cover an opened lower side of the inner space of the container support 11b. The inner space of the container support 11b may thus be defined as a space between the thermoelectric element 81 and the base plate 18. The thermoelectric element 81 may be a Peltier device or a thermoelectric cooler (TEC) to cool or heat the liquid in the container 10a of the water tank 10.

An upper surface of the mounting portion 117 may be positioned below an upper end of the container support 11b and a lower surface of the mounting portion 117 may be positioned above a lower end of the container support 11b. A lower surface of an edge of the bottom plate 12 may be provided on upper surfaces of the mounting portion 117 and the thermoelectric element 81. A warning light 91, which may be ring-shaped, may be provided on a lower surface of the mounting portion 117. The base plate 18 may be provided below the warning light 91.

The thermoelectric element 81 may be provided under and cool or heat the bottom plate 12, thereby cooling or heating the water stored in the water tank 10. The thermoelectric element 81 may maintain a temperature of water stored in the water tank 10 at a predetermined temperature.

A heat sink 84 may be provided in the inner space of the container support 11b. Further, a heat-dissipating fan 83 may be provided in the inner space of the container support 11b. A motor 82 to rotate the fan 83 may be installed between the bottom plate 12 and the base plate 18.

A plurality of radiating fins may protrude upward from a heat dissipating or diffusing plate of the heat sink 84. Upper surfaces of the plurality of radiating fins may be brought into contact with a lower surface of the thermoelectric element 81 so that heat generated in the thermoelectric element 81 may be exchanged to the plurality of radiating fins which are exposed to ambient air. Alternatively, the plurality of radiating fins may protrude downward from the heat dissipating plate of the heat sink 85, and the heat dissipating plate may contact the lower surface of the thermoelectric element 81. In such an alternative embodiment, the heat radiating fan 83 may be provided below the heat sink 84 to be surrounded by the plurality of radiating fins.

The heat sink 84 may be formed in a circular shape. Accordingly, the plurality of radiating fins may be arranged in a circumferential direction of the heat sink 84 so that an overall shape of the heat sink 84 may be annular.

The fan 83 may be provided inside the plurality of radiating fins. The plurality of radiating fins may surround the fan 83. The fan 83 may suction air in a direction of a rotation axis of the motor 82 and then discharge air in a direction perpendicular to the rotation axis of the motor 82. A rotation shaft of the motor 82 may be arranged such that the fan 83 suctions air flowing through the ventilation hole 181 of the base plate 18 and discharges the air toward the plurality of radiating fins. As an example, the rotation shaft of the motor 82 may be arranged vertically.

The heat sink 84 may be provided with a hole or grooves to guide the air passing through the ventilation holes 181 to the fan 83. A hollow portion or space may be formed at a center of the thermoelectric element 81, and the motor 82 may be installed in the space of the thermoelectric element 81. The fan 83 may be provided below the motor 82 and may be operated by the motor 82. Hot air may be exhausted through an outermost portion of the ventilation holes 181. Alternatively or in addition thereto, there may be holes or vents provided on a corner of the outer peripheral surface 116 of the container support 11b.

Further, a water temperature sensor 85 (e.g., thermometer) may be provided between the bottom plate 12 and the base plate 18. The water temperature sensor 85 may sense a temperature of the water stored in the water tank 10.

The water temperature sensor 85 may be installed in the inner space of the protrusion 121 of the bottom plate 12. The bottom plate 12 may be made of a material having high thermal conductivity or metal (e.g., stainless steel). When the temperature of the water in the water tank 10 sensed by the water temperature sensor 85 is not within a set or predetermined range, the thermoelectric element 81 may be activated to cool or heat the water, and the heat of the thermoelectric element 81 may flow through the heat sink 84 and discharged to the plurality of ventilation holes 181 (or alternatively, through holes formed on the corner of the container support 11b).

When a temperature of the thermoelectric element 81 is higher than a predetermined or reference temperature or when a temperature of the heat sink 84 is higher than a predetermined or reference temperature, the motor 82 may be operated and the fan 83 may be rotated. When the fan 83 is rotated, outside air may flow through the plurality of ventilation holes 181 and pass through the heat sink 84, cooling the heat sink 84 and the thermoelectric element 81.

Since the water temperature sensor 85 may be installed in the protrusion 121, which has a large area in contact with the water stored in the water tank 10 and entering the pump 20, it may be possible to accurately detect the temperature of the water stored in the water tank 10. Alternatively or in addition thereto, the water temperature sensor 85 may insert into the bottom plate 12 to insert into the container 10a of the water tank 10.

A proximity sensor may be further provided inside the container support 11b. The proximity sensor may be installed in the mounting portion 117. A signal (e.g., laser) of the proximity sensor may be transmitted through a hole formed in the outer peripheral surface 116 of the container support 11b or a signal transmission membrane provided on the outer peripheral surface 116 of the container support 11b to sense a position of a pet with respect to the pet water dispenser. The proximity sensor may sense whether a pet is within a predetermined distance range from the pet water sensor, and may continuously sense a position of the pet so that the controller C may determine whether a pet is approaching the pet water dispenser.

When the proximity sensor senses a pet approaching, the controller C may operate the pump 20. There may be a plurality of proximity sensors. When each of the plurality of proximity sensors senses a pet, the controller C may determine that a plurality of pets have approached the water dispenser, and may control the pump 20 to increase a pumping capacity.

The warning light 91 may be provided on a lower side of the container support 11b. The warning light 91 may be emitted according to the water level sensed by the water level sensor 86. The controller C may turn on the warning light 91 to inform the user of a lack of water or to refill the water tank 10 when the water level detected by the water level sensor 86 is lower than a predetermined value. The warning light 91 may be a ring-shaped light emitting diode (LED). The warning light 91 may be installed below the mounting portion 117.

Referring to FIGS. 2 and 4, a power supply assembly of the pet water dispenser may include the docking station 71. The docking station 71 may include a weight 711 having a sufficient weight for balancing, a cylindrical protrusion or terminal 712 formed at a center of the weight 711 and including a first connection terminal, and an electrical wire or wire 713 to apply external power to the first connection terminal. The electrical wire 713 may connect to an external power source (e.g., electrical wall socket). The weight 711 may also be referred to as a main body or body of the docking station 71.

A circular groove or recess 182 may be formed on a bottom surface of the base plate 18 to insert into the protrusion 712. The groove 182 may be provided with a second connection terminal connected to the first connection terminal Details of a connection between and configuration of the first connection terminal and the second connection terminal are disclosed in U.S. application Ser. No. 16/571,089 (DAE-00729) filed on Sep. 14, 2019, the entire contents of which are incorporated by reference herein.

The groove 182 of the base plate 18 may be rotatably provided on the protrusion 712 of the weight 711 so that the water tank 10 and the docking station 71 may rotate relative to each other. The first connection terminal and the second connection terminal may be maintained in an electrically connected state. For example, at least one of the first and second connection terminals may include an annular electrode to maintain an electrical connection during rotation. Even when the water tank 10 is rotated, an operation of the pet water dispenser may be maintained without twisting the electrical wire 713.

A power circuit module 715 provided on a printed circuit board (PCB) may be installed in the inner space of the protrusion 121 below the bottom plate 12 and above the water temperature sensor 85. The power circuit module 715 may be electrically connected to the second connection terminal.

The first wireless power transfer device 72 (e.g., a wireless power transmitter) electrically connected to the power circuit module 715 may be installed below the bottom plate 12 in the inner space of the protrusion 121. A second wireless transfer device 73 (e.g., a wireless power receiver or transceiver) may be provided in the inner assembly 100 in a space between the lower filter cover 43 and the pump 20 to align with the first wireless power transfer device 72 when the inner assembly 100 is coupled to the water tank 10.

For convenience of description, an example where the first wireless power transfer device 72 is a wireless power transmitter and where the second wireless power transfer device 73 is a wireless power receiver will be described. The wireless power receiver 73 may generate an induced voltage or current in response to an electromagnetic field generated by the wireless power transmitting unit 72.

When the inner assembly 100 is installed in the water tank 10 so that the lower filter cover 43 covers the protrusion 121, the wireless power receiver 73 may be connected to the wireless power transmitter 72, as the wireless power transmitter and receiver 72 and 73 may be positioned to align with each other.

A sealed space or chamber S may be formed in an inner space of the inner guide wall 53 between the partition plate 38 and an upper filter cover 46 to be described later. The electric device room S may be a space sealed from the water tank 10. The battery B and the controller C may be installed in the electric device room S.

The wireless power receiver 73 may be connected to the battery B via an electrical wire, and/or may generate inductive power to charge the battery B. The pump 20 may be operated by electric power supplied from the battery B even if commercial or external power supplied through the electrical wire 713 is disconnected or disabled, if the docking station 72 is not provided, or if the inner assembly 100 is misplaced enough to break a connection between the wireless power transmitter and receiver 72 and 73.

Referring to FIGS. 2, 5, and 6, the filter assembly 40 may be formed in a cylindrical shape. The pump 20 may be provided inside the filter assembly 40. A plurality of through holes 421 and 441 may be formed in a circumferential direction on circumferential surfaces of first and second filters 42 and 44, respectively. When the pump 20 is installed in an inner space of the filter assembly 40, a filtration performance and pumping efficiency may be improved. In addition, a separate fixing member or structure may not be required to fix the pump 20 in a predetermined position.

The first and second filters 42 and 44 may be tubular. The second filter 44 may be provided inside the first filter 42. The pump 20 may be provided within the second filter 44. A plurality of through holes 421 may be formed on a circumferential surface of the first filter 42. A plurality of through holes 441 may be formed on a circumferential surface of the second filter 44.

The first filter 42 may be formed in a cylindrical or truncated cone shape and may be made of a rigid material (e.g., stainless steel). The circumferential surface of the first filter 42 may be inclined to have an increasing diameter from a bottom to a top.

The first filter 42 may filter foreign substances having a particle size larger than the through holes 421 formed in the first filter 42. The through holes 421 of the first filter may be larger than the through holes 441 of the second filter 4. For example, when the pet licks water on the upper surface 31 of the water supply plate 30, food in the mouth or on the snout of the pet may be dropped and mixed with the water stored in the water tank 10. The first filter 42 may prevent such foreign matter from passing through the through hole 421.

The first and second filters 42 and 44 may be opened at top and bottom ends. The lower filter cover 43 may cover bottom ends of the first and second filters 42 and 44. The lower filter cover 43 may be formed separately from the first filter 42 to later be combined with the first filter 42, or alternatively may be formed as a single body with the first filter 42.

The lower filter cover 43 may be inserted onto the protrusion 121 formed on the bottom plate 12 of the water tank 10. The lower filter cover 43 may be configured to have a shape corresponding to an outer surface contour of the protrusion 121. The lower filter cover 43 may be formed so as to be convex upward so as to cover the protrusion 121, and may have a cavity defined therein that corresponds to a size and/or shape of the protrusion 121. The protrusion 121 may be inserted into the lower filter cover 43 when the inner assembly 100 is coupled to the water tank 10.

A flange 431 may be formed at an edge of the lower filter cover 43. The flange 431 may be inserted into the groove 122 formed on around the protrusion 121 on the bottom plate 12. The first filter 42 may be stably arranged at a predetermined position without being moved in a horizontal or lateral direction within the water tank 10.

The second filter 44 may comprise a filter housing and a filtration material 45 (e.g., carbon filter). The filter housing may include an outer wall 442 formed with the plurality of through holes 441 and an inner wall 443 spaced apart from the outer wall 442 and also having a plurality of through holes formed in a circumferential direction. The filtration material 45 may be filled in a space formed between the outer side wall 442 and the inner side wall 443.

The outer wall 442 and the inner wall 443 may extend vertically or in a longitudinal direction of the inner assembly 100 and/or the second filter 44. The filtration material 45 may filter foreign matter having a smaller particle size than plurality of through holes 441 formed in the outer wall 442.

The support cylinder 44b may be installed inside the first filter 42 below the second filter 44. The wireless power receiver 73 may be provided above the support cylinder 44b.

The second filter 44 may be formed with a support plate 444 to support a lower side of the filtration material 45 and a lower side of the pump 20. The outer side wall 442 of the second filter 44 may extend past the support plate 444 such that the support plate 444 may divide the second filter 44 into upper and lower sections. The upper section of the second filter 44 may include the filtration material 45 and the pump 20, while the lower section of the second filter 44 may be opened. The support cylinder 44b may be inserted into the lower section of the second filter 44 at a position that leaves a space between the top of the support cylinder 44b and the support plate 444 to accommodate the wireless power receiver 73. The through holes 441 of the outer wall 442 may not be formed in the lower section of the second filter 42, and thus the space where the wireless power receiver 73 is provided may be sealed from water.

The support cylinder 44b may be formed as a cap or hollow cylinder and may have an opened bottom. The lower filter cover 43 may be inserted into the opened bottom of the support cylinder 44b. A shape of an outer surface of the lower filter cover 43 may correspond to a shape of an inner surface of the support cylinder 44b.

A bottom surface of the first filter 42 may be seated on the upper surface of the flange 431, and a bottom end of the outer wall 442 of the second filter 44 may be coupled to the lower filter cover 43. The second UV filter 48 may be mounted between an upper surface of the flange 431 and bottom surfaces of the first filter 42 and the support cylinder 44b.

An upper end or side of the support cylinder 44b may be coupled to the bottom end of the outer wall 442 of the second filter 44. Threads may be optionally formed on an inner peripheral surface of the lower section of the second filter 44 and on an outer peripheral surface of the upper end of the support cylinder 44b. The threads of the second filter 44 and the spiral of the support cylinder 44b may be engaged with each other in a screwing method while the upper end of the support cylinder 44b is inserted into the lower section of the second filter 44. The filter 44 and the support cylinder 44b may thus be coupled to each other.

The wireless power receiver 73 may be seated on an upper surface of the support cylinder 44b. The upper surface or a side surface of the support cylinder 44b may be coupled to the support plate 444 via the lower section of the second filter 44.

The first UV filter 47 may be ring-shaped and may be provided on an upper peripheral surface of the support cylinder 44b under the second filter 44. The first UV filter 47 may include a plurality of first UV LEDs spaced apart from each other along a circumferential direction. The first UV filter 47 may dissolve or kill foreign substances or bacteria in the water filtered through the first filter 42 by diffusing the light or ultraviolet radiation generated by the plurality of first UV LEDs.

The plurality of first UV LEDs may be spaced from each other along the circumferential direction on an inner circumferential surface of the first UV filter 47. The light generated by the plurality of first UV LEDs may be diffused and irradiated radially outward from the first UV filter 47.

In addition, the second UV filter 48 may have a ring shape and may be installed below the first filter 42 on the flange 431 of the lower filter cover 43. The second UV filter 48 may include a plurality of second UV LEDs spaced apart from each other along the circumferential direction. The second UV filter 48 may dissolve or kill foreign substances or bacteria in the water stored in the water tank 10 by diffusing light generated by the plurality of second UV LEDs.

The plurality of second UV LEDs may be spaced from each other along a circumferential direction on an inner circumferential surface of the second UV filter 48, The light generated by the plurality of first UV LEDs may be diffused and irradiated radially outward of the second UV filter 48.

The filter assembly 40 may be opened at top and bottom ends. The upper filter cover 46 may cover the opened top of the filter assembly 40 and the lower filter cover 46 may cover the opened bottom of the filter assembly 40.

The upper filter cover 46 may be placed on the tops of the first and second filter filters 42 and 44. The water supply pipe 25 may penetrate the upper filter cover 46. The upper filter cover 46 may seal an upper side of the pump 20 and the tops of the first and second filters 42 and 44.

The first and second filter filters 42 and 44 and the upper filter cover 46 may be joined (e.g., welded, bonded, adhered or fused) together so as to be integral with each other. Alternatively, the first and second filters 42 and 44 may be assembled to be detachable from each other by a hook or screw method. A bottom of the support cylinder 44b may be covered by the lower filter cover 43. The support cylinder 44b and the lower filter cover 43 may be integrally made together as a single piece, or alternatively, may be formed separately and later bonded or welded together.

When the lower filter cover 43 is formed integrally with the first filter 42 or when the lower filter cover 43 is formed separately from the first filter 42 and combined with the first filter 42, the support cylinder 44b may be placed on the lower filter cover 43. When the lower filter cover 43 is formed integrally with the support cylinder 44b or the lower filter cover 43 is formed separately from the support cylinder 44b and welded or bonded with the support cylinder 44b, the filter 42 may be placed on the lower filter cover 43.

The support cylinder 44b may be optional, and the lower filter cover 43 may be configured to directly couple with the first UV filter 47 and the lower section of the second filter 44. Alternatively, the lower filter cover 43 may be optional, and the second UV filter 48 may fit into the groove 122 of the bottom plate. In addition, at least one of the first and second filters 42 and 44 may be optional, or alternatively, the pet water dispenser may include additional filters.

A water inlet 26 may be formed at a lower end of the water supply pipe 25 and the water outlet 27 may be formed at the upper end of the water supply pipe 25. The water discharged from the pump 20 flows into the water supply pipe 25 through the water inlet 26, flows along the water supply pipe 25, and then is discharged to the water supply plate 30 through the water outlet 27.

Referring to FIGS. 2, 7 to 9, the upper surface 31 of the water supply plate 30 may be a flat and smooth surface. The water supply hole 32 may be formed at a center of the water supply plate 30.

A first boss 33 may be formed on a lower surface of the water supply plate 30 to protrude downward. The first boss 33 may protrude from a center portion of the water supply plate 30 under the water supply hole 32, and may include a hole that communicates with the water supply hole 32. The hole may include a hole 331, and may be formed in a longitudinal direction corresponding to a direction in which the water supply pipe 25 extends.

The water that has been pumped to the upper surface 31 through the water supply hole 32 may flow to the edge 311 of the water supply plate 30 and eventually to the water guide 50. The water that has flowed to the edge 311 of the water supply plate 30 may reach the water guide 50 either directly or via the inclined surface 63C of the plate support 63. The water guide 50 may receive the water from the water supply plate 30 and guide the water back into the water tank 10.

Although the water supply plate 30 may be exemplified in the form of a disk, it may be formed in different shapes such as a rectangular plate shape or a triangular plate shape, and the shapes of the water supply plate 30 are not limited to the above-described shapes. The upper surface 31 may have a sloped surface with a high edge and a low center (e.g., in a concave surface or upside down cone shape) to collect water at the center of the upper surface 31. Alternatively, the upper surface 31 may be formed so as to have a high center and a low edge (e.g., in a convex surface of cone shape) to facilitate a downward flow of water toward the edge 311 of the water supply plate 30. The edge 311 of the water supply plate 30 may be formed with an edge protrusion 312 slightly protruding downward and/or outward.

An upper portion of the water supply hole 32 may be gradually increased in diameter toward the upper surface 31 so as to have a trumpet shape or contour. At least a portion of a nozzle stopper or plug 34 may be inserted into the water supply hole 32. A lower end or stem 341 of the plug 34 may be inserted into the water supply hole 32, and an upper end or head 342 of the plug 34 may be spaced upward from the water supply hole 32. Alternatively, the plug 34 may be a float which moves up and down based on water flowing out of the water outlet 27 of the water supply pipe 25, and the float may completely close the water supply hole 32 when the pump 20 is turned off.

The plug or float 34 may serve as a diverter. An outer peripheral surface of the head 342 may include at least one inclined surface that widens from bottom to top such that the plug 34 may have a trumpet shape. Water discharged from the water outlet 27 and the water supply hole 32 may strike the outer peripheral surface of the upper end of the plug 34 and spreads to a side or the edge 311 of the water supply plate 30 without touching a center of the upper surface 31. Thus, the plug 34 may produce a fountain effect.

The plug 34 may include a head cover 343 coupled to the head 342. A lower end of the stem 341 may be inserted into the water supply hole 32. A plurality of engaging pieces or ribs 345 spaced from each other in a circumferential direction of the stem 341 may prevent the stem 341 from being completely inserted into the water supply hole 32 and/or the hole of the boss 33.

The head 342 may be formed above the stem 341. The head cover 343 may be formed separately from the head 342 and coupled to the head 342, or alternatively may be integrally formed with the head 342. The head cover 343 may be slightly spaced upward from the water supply hole 32 when the stem 341 of the plug 34 is inserted into the water supply hole 32.

The outer circumferential surface of the head cover 343 may be formed as an inclined surface that inclines inward from a top of the head cover 343 to a bottom of the head cover 343. The water discharged from the water outlet 27 may collide with the outer peripheral surface of the head cover 343 and spread to the side of the water supply plate 30.

The top end or water outlet 27 of the water supply pipe 25 is inserted into the water supply hole 32, or may be provided below the water supply hole 32 so that the water outlet 27 may communicate with the water supply hole 32. The ribs 345 may contact an inner surface of the water supply hole 32 so that the plug 34 may be supported at a predetermined position in the water supply hole 32. Alternatively, the ribs 345 may be captured within the water supply hole 32. The water supply hole 32 may include grooves to allow the ribs 345 to move up and down based on water being pumped when the plug 34 serves as a float.

The water discharged from the water outlet 27 may be supplied to the center of the upper surface 31 while being sprayed in the form of a ring through the water supply hole 32 against the head 342 and/or head cover 343 of the plug 34. The water supplied to the center of the upper surface 31 may flow over the upper surface 31 toward the edge 311 of the water supply plate 30.

The water supply plate 30 may be made of stainless steel. Alternatively, the water supply plate 30 may be made of a transparent or semi-transparent material to transmit light. The water supply plate 30 may be formed to have a thin thickness.

A plate support 36 to support the water supply plate 30 may be provided below the water supply plate 30. The plate support 36 may also be referred to as a plate frame. The plate support 36 may be supported by a light support or base 62 and/or the support 63, which will be described later.

The plate support 36 may include an outer ring 361 abutting pas the edge 311 of the water supply plate 30 and the edge protrusion 312, a hub ring 362 positioned at a center of the plate support 36, and a plurality of spokes 363 extending between the outer ring 361 and the hub ring 361. A second boss 364 may protrude downward from a lower side of the hub ring 362. The first boss 33 of the water supply plate 30 may be inserted into a hole 365 formed in the hub ring 362 and the second boss 364.

A sealing ring 37 may be forcedly inserted between the first boss 33 formed in the water supply plate 30 and the second boss 364 formed in the plate support 36. The sealing ring 37 may be made out of an elastic material (e.g., rubber) and may also be referred to as a rubber ring or packing ring 37.

The water supply pipe 25 may be provided below the water supply plate 30 and penetrate the partition plate 38, which may be located below the plate support 36. The water outlet 27 may be connected to the water supply hole 32 of the water supply plate 30.

A third UV filter 49 to sterilize water passing through the water supply pipe 25 or to discharge water from the water outlet 27 may be provided around the water supply pipe 25.

The third UV filter 49 may be formed in a cylindrical shape having a length in the vertical direction or in a longitudinal direction of the water supply pipe 25. An upper end of the water supply pipe 25 may pass through the third UV filter 49. The upper end of the water supply pipe 25 may be inserted through the third UV filter 49 to couple to the water supply hole 32, or alternatively may be partially inserted through the third UV filter 49 to be spaced apart from the water supply hole 32 so that water leaving the water outlet 27 may flow directly through a hole or passage formed in the third UV filter 49.

The third UV filter 49 may comprise a plurality of third UV LEDs spaced apart from each other along a circumferential direction. The third UV filter 49 may dissolve or kill the foreign substances or bacteria to sterilize water discharged from the water outlet 27 of the water supply pipe 25.

The plurality of third UV LEDs may be provided on a lower surface of the third UV filter 49 along a circumferential direction. Accordingly, the light or ultraviolet radiation generated by the plurality of third UV LEDs may be irradiated to an upper side of the third UV filter 49.

The hole 331 formed in a lower portion of the first boss 33 may extend downward from the water supply hole 32. The hole 331 may be formed to be wider than the water supply hole 32. The hole 331 may be an insertion hole into which an upper end of the third UV filter 49 is inserted. The water supply hole 32 may have a trumpet shape with a thinner hole that connects to the wide hole. A thin portion of the water supply hole 32 may be straight or cylindrical, or may resemble a cone or trumpet. A head of the water supply hole 32 may have a radius that increases toward the upper surface 31.

An upper end 491 of the third UV filter 49 may be formed to be smaller in diameter than a remaining portion or lower end of the third UV filter 49, and may be inserted into the hole 331. An upper end of the sealing ring 37 may be formed to be smaller in diameter than a remaining portion or lower end of the sealing ring 37, and may be inserted between the first boss 33 formed in the water supply plate 30 and the second boss 364 formed in the plate support 36. The lower end of the sealing ring 37 may support a lower side of the second boss 364. The lower end of the third UV filter 49 may be inserted into the lower end of the sealing ring 37.

The lower end of the third UV filter 49 may be placed on the partition plate 38. The water supply pipe 25 may penetrate the interior of the third UV filter 49. The upper end of the third UV filter 49 may coincide with the water outlet 27, or alternatively may be installed so as to cover a position higher than the water outlet 27. The upper end of the third UV filter 49 may improve a sterilizing effect by directly irradiating UV light to the water discharged from the outlet 27.

A reinforcing ring 39 may be provided on a bottom surface of the plate support 36. The reinforcing ring 39 may be supported by reinforcing ribs 621 of the light support 62 described later.

The water supply plate 30 may be detachably assembled to the inner assembly 100. The water supply plate 30 may be moved upward to overcome an elastic or frictional force from the sealing ring 37 to be separated from the plate support 36. The user may replace the water supply plate 30 with a new water supply plate 30 in the case of repair, or may swap the water supply plate 30 with another water supply plate having a different shape or height to customize a height of the water supply plate 30 or fountain shape of water leaving the water supply hole 32 or even with a water supply plate having a different angle of inclination.

The illumination assembly 60 may be installed below the water supply plate 30 and the plate support 36. The illumination assembly 60 may include the light device 61, the light support or base 62 on which the light device 61 is installed, and the support or plate support 63 provided at a periphery of the light base 62. The support 63 may be formed in a cylindrical shape and have the inclined surface 63C. Alternatively, the illumination assembly 60 and the support 63 may be configured such that an outer surface of the support 63 may not be inclined, and the support 63 may resemble a straight cylinder.

The inclined surface 63C may be inclined such that a radius at a top side is larger than a radius at a bottom side. Alternatively, the illumination assembly 60 and the support 63 may be configured such that a radius at the bottom side is larger than a radius at the top side.

Figure 8:
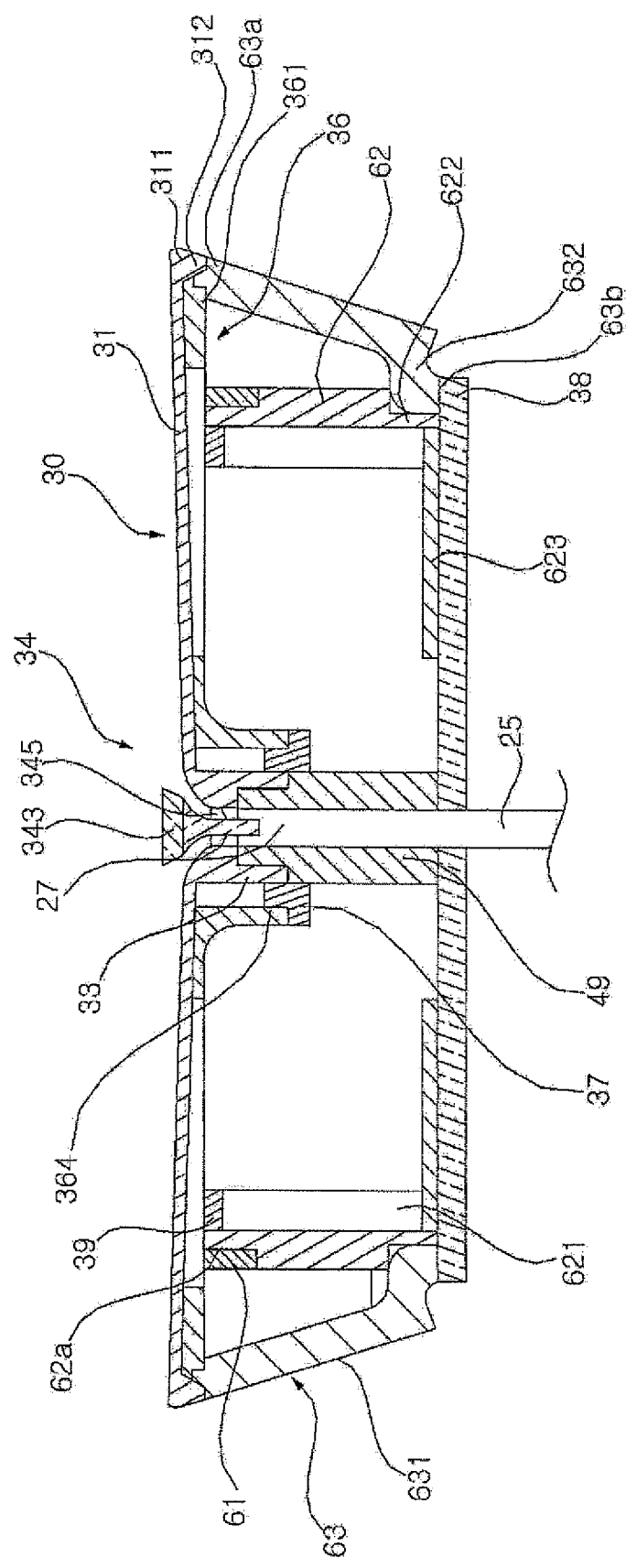
FIG. 8 is a side sectional view of an illumination assembly.
Figure 9:
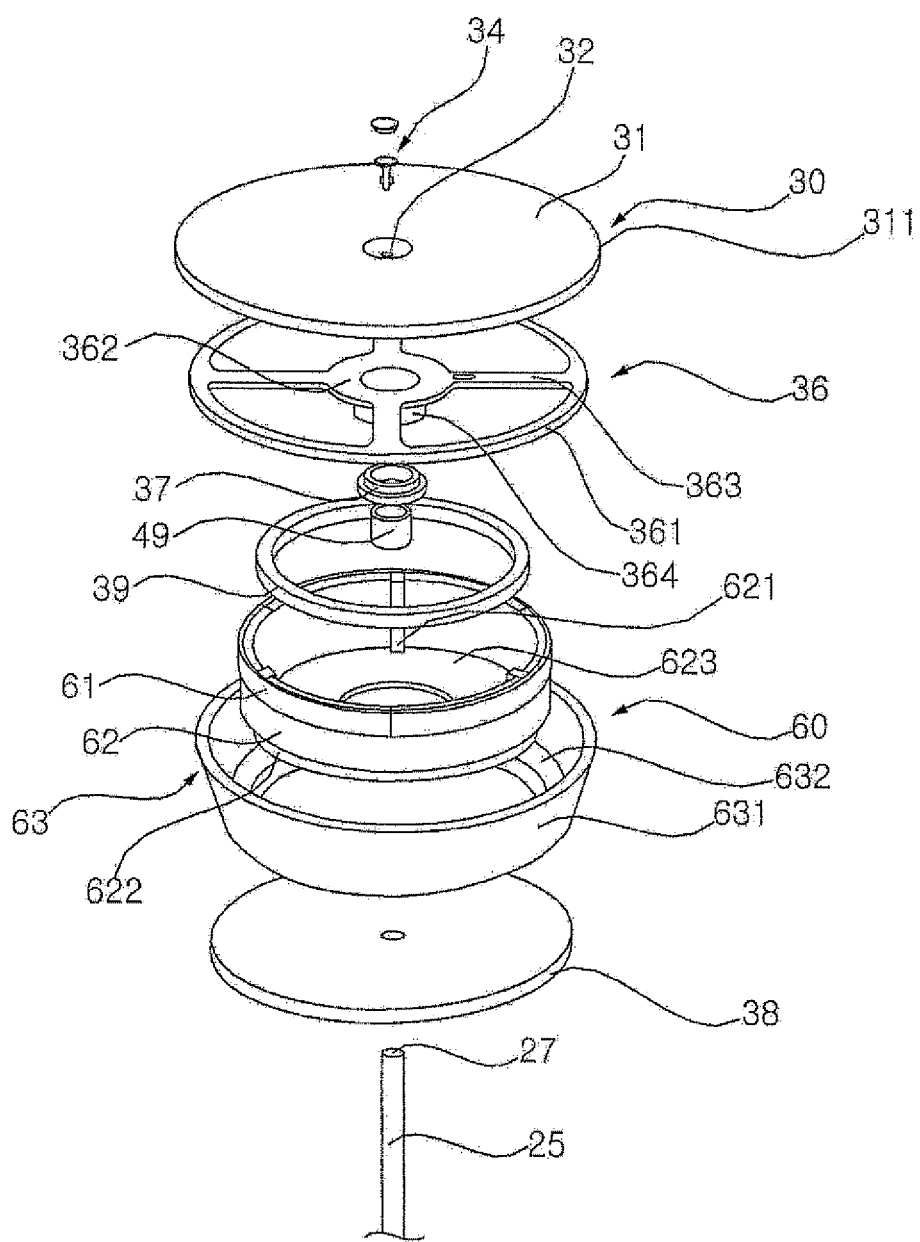
FIG. 9 is an exploded perspective view of FIG. 8.

Referring to FIG. 8, an upper surface 63a of the support 63 may be in contact with the edge protrusion 312 of the water supply plate 30 and the outer ring 361 of the plate support 36. A lower surface 63b of the support 63 may be provided on the partition plate 38. Thus, the support 63 may extend between, at the upper side, the water supply plate 30 and the outer ring 361, and, at the bottom side, the partition plate 38.

An outer circumferential surface 631 of the support 63 may form the inclined surface 63C and extend between the edge 311 of the water supply plate 30 and a bottom end of the support 63. The upper surface 63a of the support 63 may be configured to fit with the edge protrusion 312 of the water supply plate 30 so as to create a seamless connection between the edge 311 of the water supply plate 30 and the outer circumferential surface 631. Based on the flow of water pumped by the pump 20, the water dropped from the edge 311 may spill onto the inclined surface 63C or may fall vertically without flowing along the support 63. The dropping of water creates a waterfall to simulate running water, which is pleasing for animals.

The light device 61 may be formed of a plurality of light emitting diodes (LEDs) attached to an outer surface of an upper section of the light base 62 to form an array of predetermined shapes or to form a ring shape. Configurations of the light device are not limited to the above described shapes.

The reinforcing rib 621 may be formed on an inner surface of the light base 62. The reinforcing ribs 621 may support the reinforcing ring 39. The recessed or stepped portion 622 may be formed on the outer surface of a lower section of the light base 62. An inward protrusion 632 protruding inward from a lower end of the support 63 may be inserted into the recess 622. Thus, the lower end of the support 63 may couple to the light support 62 and the partition plate 38. The light device 61 may be inserted into in a concave portion or recess 62a formed on the outer surface of the upper section of the light base 62.

A printed circuit board (PCB) 623 to control a light emission of the light device 61 may be placed on an upper surface of the partition plate 38. The PCB 623 may extend horizontally from the inner surface of the lower section of the light base 62.

The light base 62, the support 63, and the partition plate 38 may be joined (e.g., adhered, fused, bonded, or welded) together. Alternatively, the light base 62, the support 63, and the partition plate 38 may be assembled to be detachable from each other.

Referring to FIGS. 1, 2, and 10, the water guide 50 may include an outer guide wall 51 forming an outer rim and an inner guide wall 53 forming an inner rim. A drain passage 52 may be formed between the outer guide wall 51 and the inner guide wall 53. The water guide 50 may further include a bottom wall 55 connecting lower sides of the outer guide wall 51 and the inner guide wall 53.

The bottom wall 55 may be provided with a discharge hole 56 to guide the water supplied from the water supply plate 30 or the plate support 63 into the water tank 10. The discharge hole 56 may be formed of at least one arc-shaped hole, a ring-shaped hole, or a circular hole formed along a circumferential direction of the bottom wall 55.

The inner guide wall 53 may be provided below the lower end of the support 63. The lower end of the support 63 may be coupled to an upper end or surface of the inner guide wall 53. A guide 54 may be formed in the inner guide wall 53. The guide 54 may protrude and/or curve toward the outer wall 51 and may be inclined downward to guide water down the drain passage 52. The guide 54 may protrude or abut from the outer surface of the support 63 toward the outer wall 51. A groove or stepped portion 541 may be formed by the guide 54 extending away from the inner guide wall 53, and the partition plate 38 may be placed in the groove 541. The support 63 may be provided on the partition plate 38 at a position corresponding to the groove 541.

The guide 54 may receive water flowing down the inclined surface 63C and guide the water downward. The guide 54 may also receive water falling off the edge 311 of the water supply plate 30 and guide the water downward. An outer surface of the guide 54 may include a convex or rounded surface 54R curved outwardly from the guide 54 and downward toward the drain passage 52. The round surface 54R may be formed at a predetermined interval from the lower end of the support 63. The water flowing downward along the inclined surface 63C may be slowed down by the round surface 54R to reduce noise generated when the water flows quickly down the inclined surface 63 or drops and splashes directly onto the round surface 54R.

The outer surface of the guide 54 may further include a vertical surface 54H extending downward from the lower end of the round surface 54R. The vertical surface 54H may be spaced apart from the bottom wall 55, as the guide 54 may include a recessed portion below the vertical wall 54H.

The guide 54 may be provided lower than an upper end of the outer guide wall 51 or lower than the upper inclined surface 513 of the guide wall 51. The outer guide wall 51 may prevent the water dropped from the edge 311 of the water supply plate 30 from splashing outside the water tank 10. Although the guide 54 is described as being formed on the inner guide wall 53, the guide 54 may alternatively protrude from the outer guide wall 51 toward the inner guide wall 53.

The groove 541 may be formed in the upper end of the guide 54. The support 63 may be placed on the upper end of the guide 54 and on an edge of the partition plate 38 after the edge of the partition plate 38 is positioned in the groove 541. Alternatively, the support 63 may be placed directly into the groove 541, and the partition plate 38 may also be placed into the groove 541 adjacent to the support 63.

The water guide 50 may be assembled to be detachable from the support 63 and the partition plate 38. Alternatively, the water guide 50 may be joined (e.g., adhered, fused, bonded, or welded) to the support 63 and the partition plate 38 so as not to be detachable. When the water guide 50 is assembled to be detachable from the support 63 and the partition plate 38, the water guide 50 may be replaced or swapped out with a water guide having a different shape or height.

A protrusion 511 may be formed on an inner surface of the outer guide wall 51 between the upper and lower inclined surfaces 513 and 514. The protrusion 511 may protrude toward the guide 54 and the inner guide wall 53. A narrow drainage passage 521 may be formed between the protrusion 511 and the guide 54.

The water dropped from the water supply plate 30 into the water guide 50 may be guided downward through the narrow drainage passage 521 after flowing on the guide 54 and the protrusion 511 for a while. The protrusion 511 may be configured to further slow the flow of water before water enters the narrow drainage passage 521. Further, foreign matter may not pass through the narrow drainage passage 521, and so the narrow drainage passage 521 may filter foreign substances (e.g., food in the mouth of a pet, etc.)

An inner peripheral surface 512 of the outer guide wall 51 extending upward from the protrusion 511 may be formed as an inclined surface that widens toward an upper end of the outer guide wall 51. A coating or covering layer or surface 59 may be applied to the inner circumferential surface 512. The coating layer 59 may be formed of a material different from that of the water guide 50. The guide 54 may be formed of a material different from the water guide 50 to enhance aestheticism, improve smoothness, and prevent scattering of water.

The upper end of the outer guide wall 51 may be formed to be higher than the inner guide wall 53. The upper inclined surface 513 may project upward and outward from the upper wall 11a to prevent water from splashing outside of the water tank 10. The upper inclined surface 513 may have a radius that is greater than a radius of the upper wall 11a.

When the inner assembly 100 is coupled to the water tank 10 and the upper inclined wall 513 is seated on the first protruding plate 111, inclinations of the upper inclined wall 513 and the upper wall 11a may be configured to form a predetermined angle θ (FIG. 2) between an outer surface of the upper wall 11a and an outer surface of the upper inclined surface 513 of the outer guide wall 51.

The upper inclined surface 513 and the lower inclined surface 514 may be formed on the outer surface of the outer guide wall 51 and may have different inclinations. A step portion or groove 515 may be formed between the upper inclined surface 513 and the lower inclined surface 514 at a height corresponding to a height of the protrusion 511. The step portion 515 may be placed on the first projecting plate 111.

The lower inclined surface 514 may be an outer inclined surface 514 of the water guide 50 supported by the inner tank wall 113 of the water tank 10. The upper inclined surface 513 of the water guide 50 may be supported by the bumper 115 attached to the upper side wall 11a. The water guide 50 may be securely coupled to the water tank 10.

In addition, an extension or flange 551 may be formed on the inner surface of the inner guide wall 53. The extension 551 may also be referred to as a protruding jaw or locking jaw. The extension 551 may be formed to extend inward below the inner surface of the inner guide wall 53 near a position where the bottom wall 55 connects to the inner guide wall 53. The extension 551 and the bottom wall 55 may form a bottom surface of the water guide 50.

The extension 551 may be placed on an edge of the upper filter cover 46. The upper filter cover 46 may be coupled inside the extension 551. The extension 551 and the upper filter cover 46 may be detachably assembled (e.g., via an arm, a hook or a screw). Alternatively, the extension 551 and the upper filter cover 46 may be joined (e.g., adhered, fused, bonded, or welded without being separated.

As described above, the filter assembly 40, the pump 20, the water supply pipe 25, the water supply plate 30, the illumination assembly 60, and the water guide 50 may be integrally combined or assembled to form a single inner assembly 100. The inner assembly 100 may be easily separated or removed from the water tank 10, and cleaning, water exchange or refill, and maintenance may be easily performed.

When the inner assembly 100 may be coupled to the water tank 10 at the water guide 50 and at the lower filter cover 43. The outer inclined surface 514 formed on the outer guide wall 51 of the water guide 50 may be coupled to the inner tank wall 113 and the first protruding plate 111, and the lower filter cover 43 and flange 431 may be inserted onto the protrusion 121 and groove 122 of the water tank 10, respectively.

When the inner assembly 100 is installed in or seated on the water tank 10, the inner assembly 100 may be stably provided at a predetermined position without being moved in the water tank 10. When the user lifts the outer guide wall 51 of the water guide 50 with the hand while the inner assembly 100 is provided in the water tank 10, the inner assembly 100 may easily separate from the water tank 10.

Since the pump 20 is installed or located inside the filter assembly 40, the water stored in the water tank 10 may flow into the filter assembly 40. The water circulated in the water tank 10 may be circulated well because the plurality of through holes 421 and 441 are formed throughout the circumferential surfaces of the first and second filters 42 and 44. In addition, since the pump 20 is installed or located inside the filter assembly 40, the pump 20 may be easily repaired after removing the filter assembly 40 from the inner assembly 100.

This application is related to U.S. application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,279 filed on Sep. 13, 2019, U.S. application Ser. No. 16/569,827 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920 filed on May 24, 2019; and 10-2019-0080603 and 10-2019-0080604 filed on Jul. 4, 2019.

Embodiments disclosed herein may be implemented as a liquid dispenser that supplies drinking water to an animal such as a pet. However, embodiments disclosed herein are not limited to pets. For example, the liquid dispenser may be used in a zoo to supply drinking water to animals kept in a zoo, research areas, wildlife preservation areas, etc.

Embodiments disclosed herein may be implemented as a pet water dispenser in which water circulated in a water tank or tank is well circulated. A pump of the pet water dispenser may be easily repaired. The pet water dispenser may sterilize water stored in a water tank. The problems solved by the present disclosure are not limited to the above-mentioned problems, and other problems not mentioned may be clearly understood by those skilled in the art from the following description.

A pet water dispenser may include a water tank or tank having an open top or upper side and an inner assembly covering the open top of the water tank. An upper portion of the inner assembly may protrude upward from the water tank, and a lower portion of the inner assembly may be inserted into the water tank. The inner assembly may include a cylindrical filter or filter assembly inserted into the water tank, and a pump installed inside the filter.

The pump may supply water in the water tank to an upper surface of the inner assembly. The upper surface of the inner assembly may protrude above the inner assembly and may be provided higher than the water tank. The water supplied to the upper surface of the inner assembly may flow downward over an edge of the upper surface to be supplied into the water tank.

Embodiments disclosed herein may include a pump installed in a water tank or tank whose upper side or top is opened, and water discharged from the pump may be transferred along a water supply pipe or pipe. A water supply plate or upper plate may be provided above the water tank, and water supplied from the water supply pipe may flow along an upper surface of the water supply plate. In the water tank, a tubular filter or filter assembly to filter the water stored in the water tank is provided. The pump may be installed inside the filter.

A plurality of through holes may be formed on a circumferential surface of the filter in its entirety in the circumferential direction. The filter may comprise a tubular first filter or filter and a tubular second filter or filter provided inside the first filter. The pump may be installed inside the second filter.

A circumferential surface of the first filter may be inclined toward the inside toward the top. The first filter may filter foreign matter having a particle size larger than that of the through hole formed in the first filter. The second filter may include a filter material or carbon filter therein. The filter material may filter foreign matter having a particle size smaller than that of the through hole formed in the second filter.

The second filter may include an outer wall having a plurality of through holes and an inner wall spaced inward from the outer wall and having a plurality of through holes. The filter material may be filled between the outer side wall and the inner side wall, and the pump may be installed in an inner space of the inner side wall.

The outer wall and the inner wall may be formed vertically. The second filter may be formed with a support plate to support a lower side of the filter material and a lower side of the pump. The outer side wall of the second filter may protrude downward from the support plate, and the second filter may be opened downward.

The filter may have a support cylinder therein. The support cylinder may be provided in the first filter. A upper end of the support cylinder may be inserted into a lower end of the second filter. A ring-shaped first UV sterilizing filter or first UV filter may be provided on an outer circumferential surface of the support cylinder. The first UV sterilizing filter may be provided below the second filter. The lower end of the second filter may be seated on an upper surface of the first UV sterilizing filter.

A lower filter cover may cover the lower side of the filter. An upper portion of the lower filter cover may be inserted into an opened lower side of the support cylinder.

A second UV sterilizing filter or second UV filter may be installed on an upper outer peripheral surface of the lower filter cover. The second UV sterilizing filter may be provided below the support cylinder.

A bottom plate of the water tank may have a tubular protrusion or protrusion protruding upward. The lower filter cover the protrusion of the bottom plate. A ring-shaped groove or recess may be formed around the protrusion of the bottom plate, and a flange inserted into the groove may be formed in the lower filter cover.

The second UV sterilizing filter may be seated on an upper surface of the flange. The lower end of the first filter and the lower end of the support cylinder may be seated on an upper surface of the second UV sterilizing filter.

A first wireless power transfer device (e.g., a wireless power transmission unit or transmitter) may be provided in the protrusion. A second wireless power transfer device (e.g., a wireless power receiving unit or receiver to receive wireless power from the wireless power transmitter) may be provided between the upper surface of the support cylinder and the supporting plate.

A tubular third UV sterilizing filter or third UV filter may be installed on an upper portion of the water supply pipe. The third UV sterilizing filter may penetrate the upper end of the water supply pipe.

A water guide or receiver covering the opened upper side of the water tank may be provided below the water supply plate, and water may be supplied from the water supply plate and discharged into the water tank. The filter may be provided below the water receiver. A plate support may connect the water supply plate and the water receiver.

The water receiver may comprise an outer wall or outer guide wall, an inner wall or inner guide wall, and a bottom wall. The outer wall may form an outer rim. The inner wall of the water receiver may form an inner rim. A drainage passage or drain may be formed between the outer wall of the water receiver and the inner wall of the water receiver. The bottom wall may connect a lower portion of the outer wall and a lower portion of the inner wall. The bottom wall may be provided with a discharge hole to discharge the water supplied from the water supply plate to the water receiver into the water tank. The filter may be connected to the lower side of the inner wall of the water receiver.

A protruding jaw portion or extension may be formed on the inner wall of the water receiver. The protruding jaw portion may protrude to an inside of the water receiver to form a bottom wall or surface of the water receiver. An inside of the protruding jaw portion may be opened. An upper filter cover may be placed on the upper side of the filter. The upper filter cover may penetrate the water supply pipe. The upper filter cover may be coupled to the protruding jaw portion to shield the opened inside of the protruding jaw portion.

Since a pump water in the pet water dispenser according to embodiments disclosed herein is installed inside a tubular filter, water stored in a water tank may be introduced into the filter in the entire circumferential direction of the filter and water circulation may be effective. In addition, since the pump is installed inside the tubular filter, it may be possible to repair the pump easily after removing the filter when the pump is repaired. Further, at least one of a first UV sterilizing filter or first UV filter and a second UV sterilizing filter or second UV filter may be installed in the filter. Thus, at least one of the first UV sterilizing filter and the second UV sterilizing filter may also have an effect of sterilizing the water stored in the water tank. The effects of the present invention are not limited to the effects mentioned above, and other effects not mentioned may be clearly understood by those skilled in the art from the description of the claims.

Embodiments disclosed herein may be implemented as a liquid dispenser including a tank, a pump provided in the tank to pump liquid through a pipe coupled to the pump, a plate provided above the tank including a hole that communicates with an outlet of the pipe and an upper surface over which liquid supplied from the pipe flows, and at least one filter provided in the tank and surrounding the pump.

A plurality of through holes may be provided on a circumferential surface of the at least one filter. At least one filter may include a first filter and a second filter provided inside the first filter, and the pump may be installed inside the second filter.

An outer circumferential surface of the first filter may be inclined. The first filter may include a plurality of through holes to filter a foreign substance having a particle size larger than that of each of the through holes in the first filter. The second filter may include a plurality of through holes to filter a foreign substance having a particle size larger than that of each of the through holes in the second filter. The second filter may include a filter material to filter foreign matter having a particle size smaller than that of the through holes formed in the second filter.

The second filter may include an outer wall having a plurality of through holes and an inner wall spaced inwardly from the outer wall and having a plurality of through holes. The filter material may be filled between the outer wall and the inner wall, and the pump may be installed in an inner space of the inner wall. The outer wall and the inner wall may extend in a longitudinal direction of the pump.

A support plate to support the filter material and the pump may extend across the outer wall of the second filter to divide the second filter into upper and lower sections. A support cylinder may be provided in the first filter and have an upper end inserted into the lower section of the second filter. A first ultraviolet (UV) filter may be provided on an outer circumferential surface of the support cylinder and below the second filter.

A lower end of the second filter may be provided on an upper surface of the first UV filter. A lower filter cover may cover a lower side of the first filter and may be inserted into the support cylinder. A second UV filter may be provided on an outer circumferential surface of the lower filter cover and below the support cylinder.

A protrusion may be formed on a bottom plate of the tank and may be configured to be inserted into the lower filter cover. A groove may be formed on the bottom plate around the protrusion, and a flange may extend from the lower filter cover and may be configured to be inserted into the groove. The second UV filter may be provided on an upper surface of the flange, and the first filter and the support cylinder may be provided on an upper surface of the second UV filter.

A wireless power transmitter may be provided in the protrusion under the base plate, and a wireless power receiver may be provided between the support cylinder and the support plate to receive wireless power from the wireless power transmitter. A third UV filter through which an upper end of the pipe passes may be provided.

Embodiments disclosed herein may be implemented as a liquid dispenser including a tank, a pump provided in the tank to pump liquid stored in the tank through a pipe, a plate having an upper surface and a hole through which water supplied from the pipe flows, a liquid guide provided below the plate to catch liquid flowing off the plate and to guide the liquid into the tank, wherein the plate and the liquid guide cover a top opening of the tank, and a filter provided below the liquid guide to filter liquid in the tank, wherein the filter surrounds the pump.

Embodiments disclosed herein may be implemented as a liquid dispenser, including a tank, a pump provided in the tank, a pipe through which liquid discharged from the pump flows, a plate having an upper surface over which liquid supplied from the pipe flows, and a liquid guide provided below the plate to receive liquid from the plate and to guide liquid into the tank. The liquid guide and the plate may cover a top opening of the tank. A support may be provided to support the plate, and the support may be supported by the liquid guide. At least one filter may be provided below the liquid guide and surrounding the pump to filter liquid in the tank.

The liquid guide may include an outer wall forming an outer surface, an inner wall forming an inner surface and connected to the at least one filter, a drain passage formed between the outer and inner walls, and a bottom wall formed with a discharge hole communicating with the drain passage to discharge water supplied from the plate to the tank. The bottom wall may extend between the outer and inner walls to form a bottom surface.

The liquid guide may further include a flange protruding inward from the inner wall to form part of the bottom surface and an upper filter cover provided on the at least one filter through which the pipe passes. The upper filter cover may be coupled to the extension to close an inner space formed within the flange of the liquid guide.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, including:
   a tank;
   a pump provided in the tank to pump liquid through a pipe coupled to the pump;
   a plate provided above the tank including a hole that communicates with an outlet of the pipe and an upper surface over which liquid supplied from the pipe flows; and
   at least one filter provided in the tank and surrounding the pump,
   wherein:
      the at least one filter includes:
         a first filter having a plurality of through holes, and
         a second filter provided inside the first filter,
         the pump is installed inside the second filter, the second filter includes:
an outer wall having a plurality of through holes,
an inner wall spaced inwardly from the outer wall and having a plurality of through holes, and
a filter material positioned between the outer wall and the inner wall, and
the pump is installed in an inner space of the inner wall of the second filter.

2. The liquid dispenser of claim 1, wherein a plurality of through holes are provided on a circumferential surface of the at least one filter.

3. The liquid dispenser of claim 1, wherein an outer circumferential surface of the first filter is inclined.

4. The liquid dispenser of claim 1,
wherein the plurality of through holes in the outer wall of the second filter filter a foreign substance having a particle size larger than that of each of the through holes in the outer wall of the second filter, and
wherein the filter material filters foreign matter having a particle size smaller than that of the through holes formed in the outer wall of the second filter.

5. The liquid dispenser of claim 1, wherein the outer wall and the inner wall extend in a longitudinal direction of the pump.

6. The liquid dispenser of claim 1, further including:
a support plate to support the filter material and the pump, the support plate extending across the outer wall of the second filter to divide the second filter into upper and lower sections;
a support cylinder provided in the first filter and having an upper end inserted into the lower section of the second filter; and
a first ultraviolet (UV) filter provided on an outer circumferential surface of the support cylinder and provided below the second filter.

7. The liquid dispenser of claim 6, wherein a lower end of the second filter is provided on an upper surface of the first UV filter.

8. The liquid dispenser of claim 6, further including a lower filter cover covering a lower side of the first filter and inserted into the support cylinder.

9. The liquid dispenser of claim 8, further comprising a second UV filter provided on an outer circumferential surface of the lower filter cover and below the support cylinder.

10. The liquid dispenser of claim 9, further including a protrusion formed on a bottom plate of the tank and configured to be inserted into the lower filter cover.

11. The liquid dispenser of claim 10, further including:
a groove formed on the bottom plate around the protrusion; and
a flange extending from the lower filter cover and configured to be inserted into the groove.

12. The liquid dispenser of claim 11, wherein the second UV filter is provided on an upper surface of the flange, and the first filter and the support cylinder are provided on an upper surface of the second UV filter.

13. The liquid dispenser of claim 10, further including:
a wireless power transmitter provided in the protrusion; and
a wireless power receiver provided between the support cylinder and the support plate to receive wireless power from the wireless power transmitter.

14. The liquid dispenser according to claim 1, further comprising an UV filter through which an upper end of the pipe passes.

15. A liquid dispenser, including:
a tank;
a pump provided in the tank to pump liquid stored in the tank through a pipe;
a plate having an upper surface and a hole through which water supplied from the pipe flows;
a liquid guide provided below the plate to catch liquid flowing off the plate and to guide the liquid into the tank, wherein the plate and the liquid guide cover a top opening of the tank; and
a filter provided below the liquid guide to filter liquid in the tank, wherein the filter surrounds the pump,
wherein:
the at least one filter includes:
a first filter having a plurality of through holes, and
a second filter provided inside the first filter,
the pump is installed inside the second filter,
the second filter includes:
an outer wall having a plurality of through holes,
an inner wall spaced inwardly from the outer wall and having a plurality of through holes, and
a filter material positioned between the outer wall and the inner wall, and
the pump is installed in an inner space of the inner wall of the second filter.

16. A liquid dispenser, including:
a tank;
a pump provided in the tank;
a pipe through which liquid discharged from the pump flows;
a plate having an upper surface over which liquid supplied from the pipe flows;
a liquid guide provided below the plate to receive liquid from the plate and to guide liquid into the tank, wherein the liquid guide and the plate cover a top opening of the tank;
a support to support the plate, and supported by the liquid guide; and
at least one filter provided below the liquid guide and surrounding the pump to filter liquid in the tank,
wherein the liquid guide includes:
an outer wall forming an outer surface;
an inner wall forming an inner surface and connected to the at least one filter;
a drain passage formed between the outer and inner walls; and
a bottom wall formed with a discharge hole communicating with the drain passage to discharge water supplied from the plate to the tank, the bottom wall extending between the outer and inner walls to form a bottom surface.

17. The liquid dispenser of claim 16, wherein the liquid guide further includes:
a flange protruding inward from the inner wall to form part of the bottom surface; and
an upper filter cover provided on the at least one filter through which the pipe passes, wherein the upper filter cover is coupled to the extension to close an inner space formed within the flange of the liquid guide.

* * * * *